(12) United States Patent  (10) Patent No.: US 7,908,338 B2
Ogasawara  (45) Date of Patent: Mar. 15, 2011

(54) CONTENT RETRIEVAL METHOD AND APPARATUS, COMMUNICATION SYSTEM AND COMMUNICATION METHOD

(75) Inventor: Tsutomu Ogasawara, Kanagawa (JP)

(73) Assignee: Sony Corporation, Tokyo (JP)

( * ) Notice: Subject to any disclaimer, the term of this patent is extended or adjusted under 35 U.S.C. 154(b) by 786 days.

(21) Appl. No.: 10/203,114

(22) PCT Filed: Dec. 7, 2001

(86) PCT No.: PCT/JP01/10755
§ 371 (c)(1),
(2), (4) Date: Aug. 5, 2002

(87) PCT Pub. No.: WO02/47066
PCT Pub. Date: Jun. 13, 2002

(65) Prior Publication Data
US 2003/0100967 A1    May 29, 2003

(30) Foreign Application Priority Data

Dec. 7, 2000  (JP) ................................ P2000-373006
Sep. 4, 2001  (JP) ................................ P2001-268123

(51) Int. Cl.
*G06F 17/30* (2006.01)
(52) U.S. Cl. ...................................... 709/217; 707/769
(58) Field of Classification Search .......... 709/217–219; 707/3, 6, 769; 84/609, 611
See application file for complete search history.

(56) References Cited

U.S. PATENT DOCUMENTS

| 5,963,957 | A  | * | 10/1999 | Hoffberg | 707/102 |
| 6,222,807 | B1 |   | 4/2001  | Min-Jae  |         |
| 6,256,633 | B1 | * | 7/2001  | Dharap   | 707/3   |

(Continued)

FOREIGN PATENT DOCUMENTS

JP    07-272462    10/1995
(Continued)

OTHER PUBLICATIONS

Communication issued from Japan Patent Office, dated Feb. 2, 2010, in counterpart foreign patent application No. 2000-373006.

(Continued)

*Primary Examiner* — Patrice L Winder
(74) *Attorney, Agent, or Firm* — Finnegan, Henderson, Farabow, Garrett & Dunner, L.L.P.

(57) ABSTRACT

The present invention is relative to an apparatus for retrieving desired music number data from a large number of music number data recorded on a large capacity recording medium. The apparatus includes memories (11), (12) in which to store a plural number of music number data, a rhythm inputting unit (13) to which a rhythm pattern of a music number is input, a retrieving unit (18) for retrieving music number data stored in the memory (11) based on the input rhythm pattern input at the rhythm inputting unit (13) and a display unit (23) in which to display the information relevant to the music number data as found out by the retrieving unit (18). The retrieving unit (18) detects plural registered rhythm patterns which are stored in the memory (11), (12) and which are similar to the input rhythm pattern, while retrieving plural content data corresponding to the plural registered rhythm patterns. Moreover, the retrieving unit (18) is responsive to the user input to select one of the plural content data.

75 Claims, 17 Drawing Sheets

U.S. PATENT DOCUMENTS

| | | | |
|---|---|---|---|
| 6,271,455 B1 | 8/2001 | Ishigaki et al. | |
| 6,307,139 B1 * | 10/2001 | Iwamura | 84/601 |
| 6,476,306 B2 * | 11/2002 | Huopaniemi et al. | 84/609 |
| 6,504,089 B1 * | 1/2003 | Negishi et al. | 84/609 |
| 6,678,680 B1 * | 1/2004 | Woo | 84/602 |
| 6,973,429 B2 * | 12/2005 | Smith | 704/257 |
| 2002/0073098 A1 * | 6/2002 | Zhang et al. | 707/104.1 |
| 2003/0023421 A1 * | 1/2003 | Finn et al. | 84/609 |

FOREIGN PATENT DOCUMENTS

| | | |
|---|---|---|
| JP | 08-123818 | 5/1996 |
| JP | 08-180061 | 7/1996 |
| JP | 9-281968 | 10/1997 |
| JP | 10-134549 | 5/1998 |
| JP | 11-120198 | 4/1999 |
| JP | 11-175546 | 7/1999 |
| JP | 11-338868 | 12/1999 |
| JP | 2000-267657 | 9/2000 |
| JP | 2001-290474 | 10/2001 |
| KR | 10-1999-0077686 | 10/1999 |
| KR | 10-2000-0068642 | 11/2000 |

OTHER PUBLICATIONS

Communcation issued from Korean Patent Office, dated Jun. 30, 2008, in counterpart foreign patent application No. 10-2002-7010106.

* cited by examiner

US 7,908,338 B2

CONTENT RETRIEVAL METHOD AND APPARATUS, COMMUNICATION SYSTEM AND COMMUNICATION METHOD

TECHNICAL FIELD

This invention relates to music number retrieving methods and apparatus in which the music numbers stored in storage means, such as hard discs, optical discs, magneto-optical discs or IC cards, can be retrieved by inputting rhythm patterns of content data, such as music numbers. More particularly, it relates to a communication system and a communication method whereby a recording medium holding a retrieval program recorded thereon or content data stored, e.g., in a server device can be retrieved over a network.

BACKGROUND ART

In a conventional recording and/or reproducing apparatus for recording and/or reproducing music number data, the music number data recorded on a recording medium, such as an optical disc, a magneto-optical disc or an IC card, is read out and reproduced. Meanwhile, scores of musical numbers, lasting for approximately two hours, are recorded on a recording medium, such as an optical disc, a magneto-optical disc or an IC card. In retrieving music number data recorded on the recording medium, the recording and/or reproducing apparatus causes an optical pickup to traverse the recording tracks of the recording medium, in a forward direction, responsive to a user's operation, to jump to a recording track bearing the address specified by the user. Moreover, a retrieval key word, such as a name of the music air, can be input to permit retrieval of the music number data based on this retrieval key word.

By causing the optical pickup to traverse the recording track through the recording tracks in the forward direction to retrieve preset music number data, much time is needed in retrieval if many music number data are recorded, thus inconveniencing the user in retrieving the music number data.

In retrieving preset music number data by specifying an address of a recording track, the user has to memorize the address where the preset music number data is recorded. If the user does not memorize the address, he or she feels inconvenienced in retrieving the music number data.

Moreover, if, in retrieving preset music number data using the retrieval key word, the user forgets the retrieval key data, it becomes impossible to retrieve the data.

In particular, in a recording and/or reproducing apparatus capable of retrieving the music number data recorded on the recording medium, a keyboard for inputting a retrieval key word is required, while a microphone is needed in inputting the retrieval key word with speech.

When a keyboard or a microphone is mounted on the recording and/or reproducing apparatus, the hardware is complex, such that, when the recording and/or reproducing apparatus is portable, the apparatus is bulky in size and inconvenient to transport. In case of an apparatus in which the retrieval keyword is input with speech, not only the speech uttered by the user but the noise is collected in a noisy place, such as in a street or an electrically rolling stock, to render it impossible to recognize the speech correctly.

Meanwhile, there is such a recording medium, currently available, in which the retrieval key word is recorded in a management area of the recording medium at the outset. However, since this retrieval key word is not one input by the user, it may be an occurrence that the user finds it difficult to memorize the retrieval key word.

DISCLOSURE OF THE INVENTION

It is therefore an object of the present invention to provide content retrieval methods and apparatus and a recording medium holding a content retrieval program, in which, even when much content data has been recorded on a large capacity recording medium, the user is able to retrieve desired content data extremely readily.

It is another object of the present invention to provide content retrieval methods and apparatus and a recording medium holding a content retrieval program, in which content data stored in the storage means is retrieved as a registered rhythm pattern registered by the user from one content data to another is compared to an input rhythm pattern as input by the user in making a retrieval to enable prompt retrieval of the content data.

It is still another object of the present invention to provide content retrieval methods and apparatus and a recording medium holding a content retrieval program, in which, a pattern recognition ratio at the time of the next retrieval can be improved through learning an input rhythm pattern.

It is yet another object of the present invention to provide a communication system in which plural content data stored in a server device over a network can be readily retrieved and downloaded from a terminal device, and communication methods and apparatus usable for this communication system.

For accomplishing the above object, the content retrieval apparatus according to the present invention includes storage means for storing a plurality of content data, inputting means for inputting a rhythm pattern of the input data, controlling means for retrieving the content data stored in the storage means, based on an input rhythm pattern input by the inputting means, and informing means for informing the information relevant to content data as retrieved by the controlling means.

A content retrieval method according to the present invention includes a step of inputting a rhythm pattern of content data, a step of retrieving the content data stored in the storage means based on the input rhythm pattern as input, and a step of informing the information pertinent to the content data as retrieved.

A recording medium according to the present invention is a recording medium holding a computer-readable program, recorded thereon, in which the program includes a step of retrieving the content data stored in the storage means based on the input rhythm pattern of the input content data, and a step of informing the information pertinent to the content data as retrieved.

A communication system according to the present invention includes inputting means for inputting a rhythm pattern of content data, first communication means for transmitting the input rhythm pattern input from the inputting means, second communication means for receiving the input rhythm pattern transmitted from the first communication means, storage means for storing a plurality of content data, retrieving means for retrieving content data stored in the storage means, based on the input rhythm pattern received by the second communication means and recording and/or reproducing means for receiving the content data complying with results of retrieval of the retrieval means transmitted by the second communication means, by the first communication means, and for recording and/or reproducing the content data.

A communication method according to the present invention includes a step of inputting a rhythm pattern of content data, a step of transmitting the input rhythm pattern as input, a step of receiving the input rhythm pattern as transmitted, a step of storing a plurality of content data in storage means, a step of retrieving content data stored in the storage means, based on the input rhythm pattern as received, a step of receiving the content data complying with results of retrieval and a step of recording and/or reproducing the content data as received.

A communication apparatus according to the present invention includes receiving means for receiving an input rhythm pattern of content data input to another apparatus, storage means for storing a plurality of content data, retrieving means for retrieving content data stored in the storage means, based on an input rhythm pattern received by the receiving means, and transmission means for transmitting the content data corresponding to the retrieved results of the retrieval means to the other apparatus.

A communication method according to the present invention includes a step of storing a plurality of content data in storage means, a step of receiving an input rhythm pattern of content data input to the other apparatus, a step of retrieving content data stored in the storage means based on the received input pattern and a step of transmitting content data complying with the retrieved result to the other apparatus.

Another communication apparatus according to the present invention includes inputting means for inputting a rhythm pattern of content data, transmission means for transmitting the rhythm pattern, input by the inputting means to another apparatus where a plurality of content data is stored, receiving means for receiving retrieved results complying with the rhythm pattern transmitted from the other apparatus by the transmission means and for receiving the content data complying with a request for transmission and recording and/or reproducing means for recording and/or reproducing content data received by the receiving means.

Another communication method according to the present invention includes a step of inputting a rhythm pattern of content data, a step of transmitting the input rhythm pattern as input, a step of receiving retrieved results complying with the rhythm pattern transmitted from the other apparatus, a step of selecting at least one content data from the received result of retrieval and transmitting a request to the other apparatus for transmission of selected content data, a step of receiving content data complying with the transmission request and a step of recording and/or reproducing the received content data.

Other objects, features and advantages of the present invention will become more apparent from reading the embodiments of the present invention as shown in the drawings.

BRIEF DESCRIPTION OF THE DRAWINGS

FIG. 9A shows a normalized input rhythm pattern px (yesterday once more), FIG. 9B shows a normalized registered rhythm pattern py (yellow submarine) and FIG. 9C shows the relationship between the input rhythm pattern px and the registered rhythm pattern py.

FIG. 10A shows a normalized input rhythm pattern px (yesterday once more), FIG. 10B shows a normalized registered rhythm pattern py (yesterday once more) and FIG. 10C shows the relationship between the input rhythm pattern px and the registered rhythm pattern py.

BEST MODE FOR CARRYING OUT THE INVENTION

Figure 1:
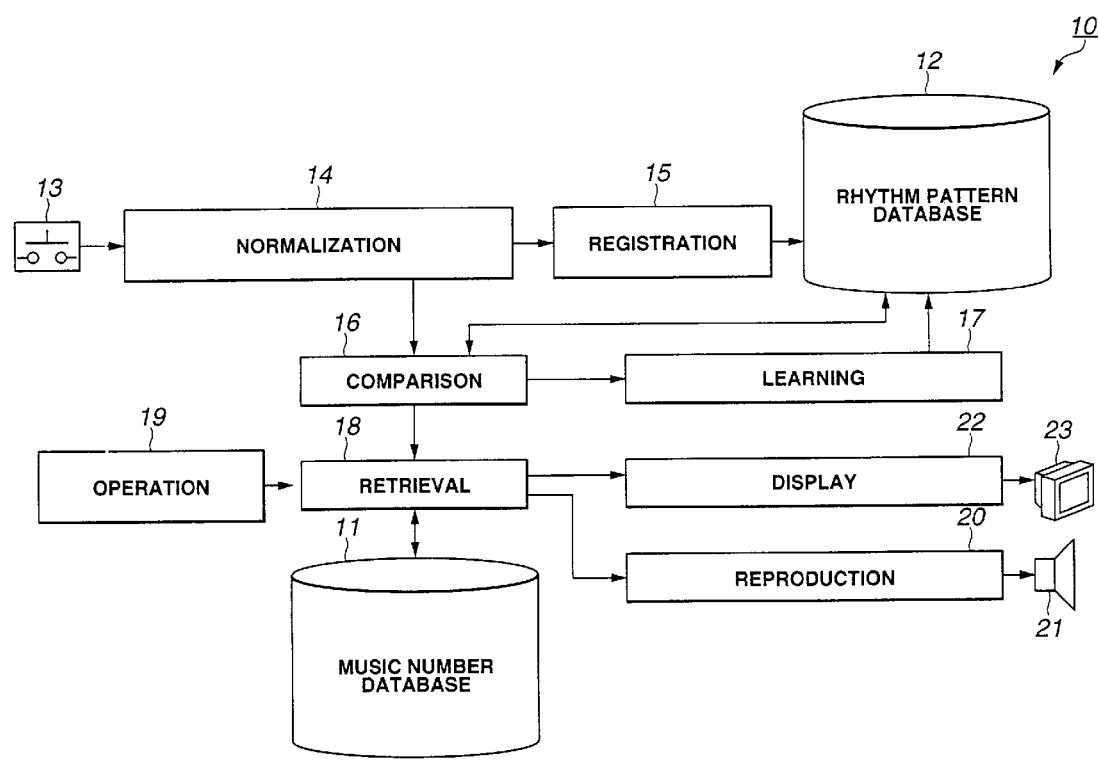
FIG. 1 is a block diagram for functionally illustrating a music number retrieving apparatus embodying the present invention.

Referring to the drawings, a music number retrieval apparatus embodying the present invention is explained in detail.

Referring to FIG. 1, the music number retrieval apparatus 10 includes a first storage unit 11, in which plural music number data are stored to form a music number database, and a second storage unit 12 in which rhythm patterns operating as retrieving keywords of the music number data stored in the first storage unit 11 are stored to form a rhythm pattern database. The music number retrieval apparatus 10 also includes a rhythm inputting unit 13 for inputting rhythm patterns of music number data the user desires to listen to and a normalizing unit 14 for normalizing an input rhythm pattern input from the rhythm inputting unit 13. The music number retrieval apparatus 10 also includes a registration processing unit 15 for registering the rhythm patterns in the database formed in the second storage unit 12 and a comparator 16 for comparing the input rhythm patterns to registered rhythm patterns stored in the second storage unit 12. The music number retrieval apparatus 10 also includes a learning unit 17 for improving the hit ratio in retrieval and a retrieval unit 18 for retrieving relevant music number data based on the results of comparison in the comparator 16 to extract the music number data thus retrieved from the first storage unit 11. The music number retrieval apparatus 10 also includes an operating unit 19 for effecting retrieval, recording and/or reproduction etc and a reproducing unit 20 for reproducing the retrieved music number data. In addition, the music number retrieval apparatus 10 includes a loudspeaker 21 for outputting music number data reproduced by the reproducing unit 20, a display processing unit 22 for display controlling, such as sorting, the data for displaying the retrieved results, and a display unit 23 for demonstrating the information pertinent to music number data, such as retrieved results, titles, artists' names or album names.

The first storage unit 11 is a large-capacity hard disc, enclosed, e.g., in a main body unit of the apparatus, or a removable medium that may be mounted to or dismounted from the main body unit of the apparatus, such as optical disc, magneto-optical disc or IC card. In this first storage unit 11 is formed a music number database in which music number data are associated with the information relevant to the music number data recorded therein. In addition to the music number data, the relevant information, such as music number title, a name of an artist, a name of a recording company, lyric, lyric writer, composer or the copyright management information, is stored as the information is compressed and encrypted in accordance with a preset format.

The second storage unit 12 is comprised of a large-capacity hard disc or a semiconductor memory, enclosed in the main body unit of the apparatus. In this second storage unit 12, there is formed a rhythm pattern database in which there are stored rhythm patterns used in retrieving music number data saved in the first storage unit 11. Each registered rhythm pattern is associated with music number data stored in the first storage unit 11.

Specifically, pointers P1 to P7, such as identification numbers of the associated music number data M, stored in the first storage unit 11, are associated with rhythm patterns R1 to R7, registered by the user in the main body unit of the apparatus. When a preset rhythm pattern is specified, the rhythm pattern database is able to retrieve relevant music number data from the music number data of the first storage unit 11. For example, in an instance shown in FIG. 2, the registered rhythm pattern R1 is associated with the pointer P1 which pointer P1 is associated with music number data M1. The registered rhythm pattern R2 is associated with the pointer P2, which pointer P2 is associated with music number data M2. Moreover, the registered rhythm pattern R3 is associated with the pointer P3, which pointer P3 is associated with music number data M3.

Meanwhile, not only a portion of the rhythm of the music number, such as its high spot part or an introductory portion, but also a title of the music number, artist's name, album name or genre of the music number, may be used as a keyword for retrieving the music number data. That is, in retrieving music number data, plural retrieval keywords may be affixed to given music number data.

Figure 2:
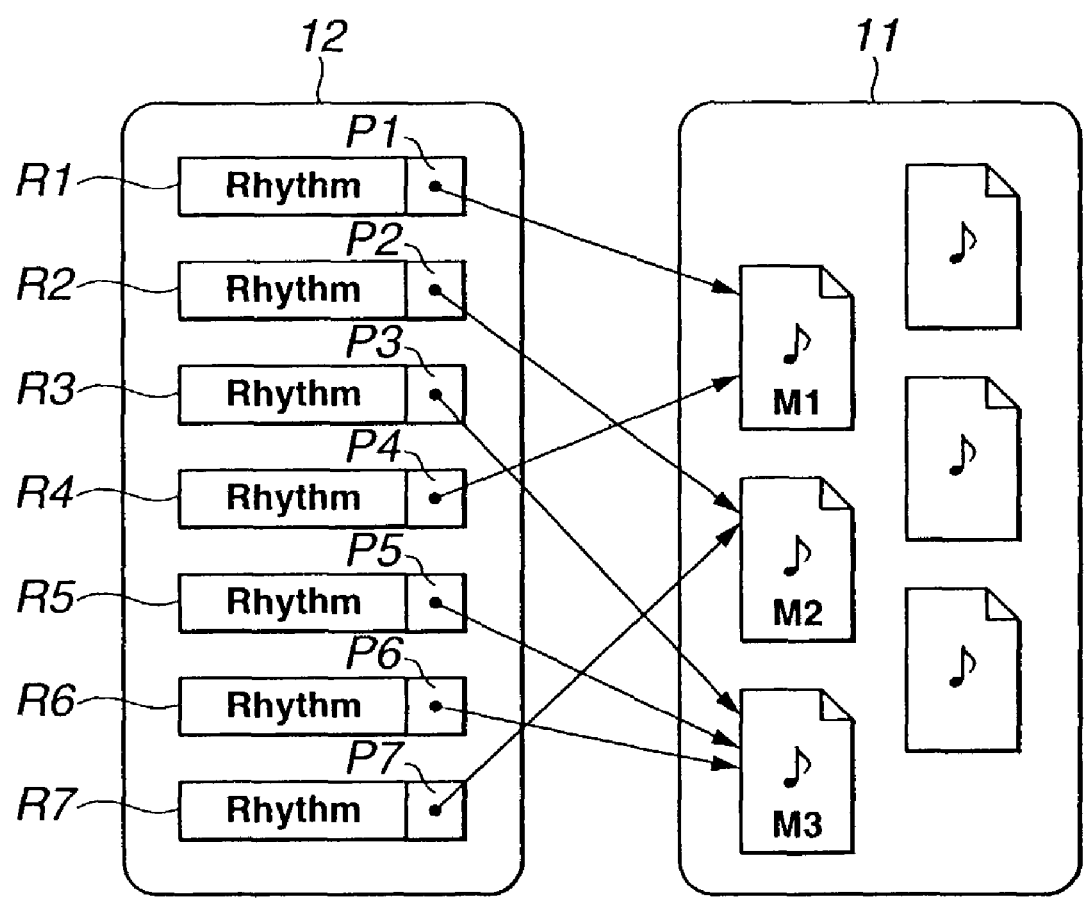
FIG. 2 illustrates a structure of a database constructed in the first and second storage units.

In an instance shown in FIG. 2, the music number data M1 is associated not only with the point P1 but also with the point P4, such that the music number data M1 can also be retrieved by the registered rhythm pattern R4. For example, if the registered rhythm pattern R1 is the rhythm pattern of the high spot part of the music number data M1, the registered rhythm pattern R4 is the rhythm pattern of the artist's name. Moreover, the music number data M2 is associated not only with the point P2 but also with the point P7, such that it can also be retrieved by the registered rhythm pattern R7. For example, if the registered rhythm pattern R2 is the rhythm pattern of the introductory part of the music number data M1, the registered rhythm pattern R7 is the rhythm pattern of music number data of pops, rock, jazz, classic or the like genre of the music number data. Additionally, the music number data M3 is associated not only with the point P3 but also with the points P5, P6, such that it can also be retrieved by the registered rhythm patterns R5 and R6. For example, if the registered rhythm pattern R3 is the rhythm pattern of the high spot of the music number data M1, the registered rhythm pattern R5 is the rhythm pattern of music number data of pops, rock, jazz, classic or the like genre of the music number data. The registered rhythm pattern R6 is the rhythm pattern of the artist's name.

In the instance shown in FIG. 2, rhythm patterns R are associated as plural retrieval keywords with a given music number data M of the first storage unit 11, such that the user is able to retrieve music number data using variable keywords.

Figure 3:
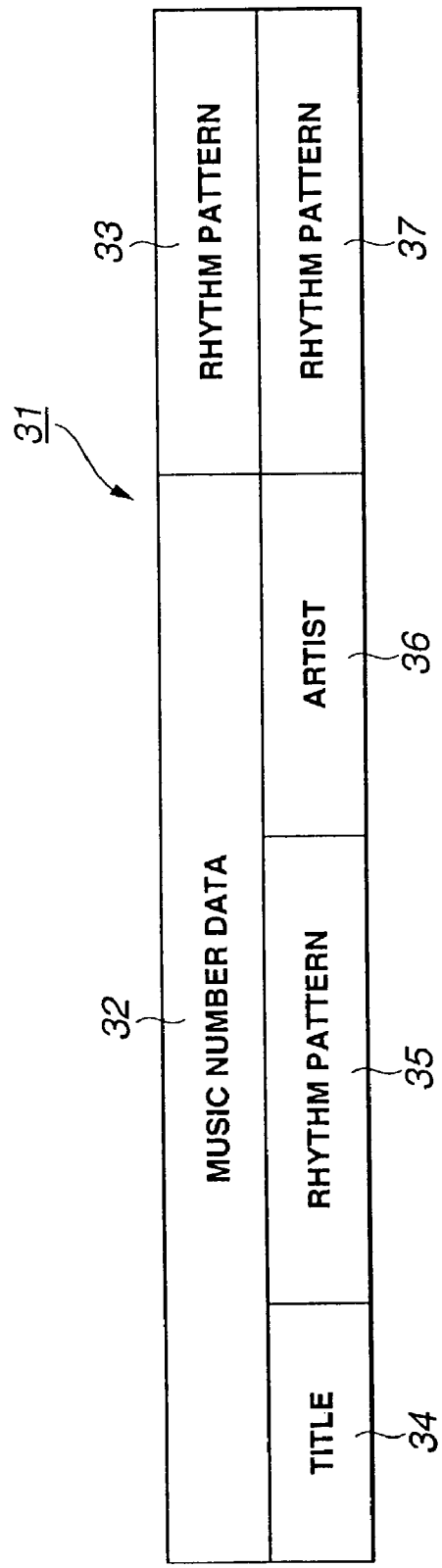
FIG. 3 illustrates another structure of a database constructed in first and second storage units.

The rhythm patterns can also be recorded in a recording area of music number data, as shown in FIG. 3. That is, in a recording area 31 of each music number data, there are provided a music number recording area 32 in which to record music number data, a recording area 33 of music number rhythm patterns, for recording the rhythm patterns of the music number data, a title recording area 34, in which to record titles of the music number data, a title rhythm pattern recording area 35, in which to record rhythm patterns of the titles, an artist name recording area 36 in which to record artist's name of the music number data, and an artist name rhythm pattern recording area 37 in which to record rhythm patterns of the artists' names. In such method for supervising the music number data and the rhythm patterns, management may be facilitated by unitarily supervising the music number data and the rhythm patterns without providing pointers. Meanwhile, the rhythm patterns, as retrieval key names, may be the lyric writers, composers or the genres, in addition to the rhythm patterns of the music number data, titles or the artists' names, while the number of the rhythm patterns, which operate as retrieving keywords, is not limited to the instance shown in FIG. 3.

Figure 4:
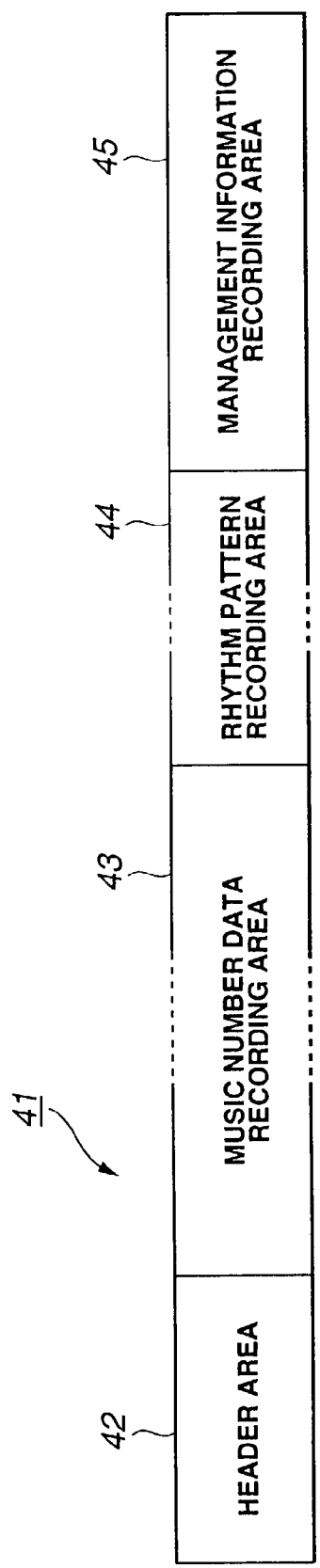
FIG. 4 illustrates yet another structure of a database constructed in the first and second storage units.

The music number data and the rhythm patterns may also be supervised as shown in FIG. 4. That is, a recording area 41 is provided with a header area 42, in which there is recorded the header, such as names of music numbers, for example an address of each music number data or the name of each music number data, a music number data recording area 43, in which music number data has been recorded in association with the header, a rhythm pattern recording area 44 in which rhythm patterns of respective music number data have been recorded, and a management information recording area 45 in which there has been recorded the management information associating the music number data and rhythm patterns with each other. In such management method for the music number data and the rhythm patterns, the management may be facilitated by unitarily supervising the music number data and the rhythm patterns without providing any pointers.

The rhythm inputting unit 13 serves for inputting registered rhythm patterns of music number data saved in the second storage unit 12 and for inputting input rhythm patterns for retrieving the music number data stored in the first storage unit 11. For inputting the rhythm patterns, the rhythm inputting unit 13 has its pressed portion formed by one or more pushbuttons or levers. That is, the rhythm inputting unit 13 detects changes along the time axis, such as the number of times of pushing operations or the pushing intervals, when the pushed portion is hit by the user with e.g., a finger within a preset time duration, in a tuned relationship to the rhythm.

Specifically, the rhythm inputting method at the rhythm inputting unit 13 is explained with reference to FIG. 5. Meanwhile, in FIGS. 5A to 5D, black circles indicate the rhythm inputting unit 13 being pushed, that is hit, by the user. Referring to FIGS. 5A to 5D, when humming the music number data, artists' names or the title names, the user hits the rhythm inputting unit 13 with the sound excluding the long sound, that is with the short sound.

Figure 5A:
FIGS. 5A to 5D illustrate rhythm pattern inputting instances.
Figure 5B:
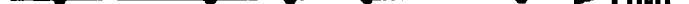
Figure 5C:
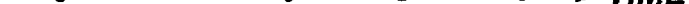
Figure 5D:
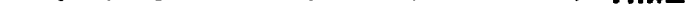

In the instance of FIG. 5A, the user hits the rhythm inputting unit 13 with 'la', without hitting it with '-'. In the instance shown in FIG. 5B, the user hits the rhythm inputting unit 13 with 'kar', 'pə', 'n', 'tə' and 'z' of the 'carpenters', as an artist's name, without hitting it between 'kar' and 'pə', nor in the long sound between 'tə' and 'z'. In the instance shown in FIG. 5C, the user hits the rhythm inputting unit 13 with 'bi', 'tə', 'l' and 'z', of the beetles, as the artists' name, without hitting it at the long sound between 'bi' and 'tə'. In the instance shown in FIG. 5D, the user hits the rhythm inputting unit 13 at 'je', 'lou', 'sə', 'b', 'mə' 'ri' and 'n', without hitting it at a long sound between 'lou' and 'sə'.

Thus, the rhythm inputting unit 13 detects the number of and the interval between the short sounds within a preset time such as music number data, title names or artists' names. On receipt of a rhythm pattern, the rhythm inputting unit 13 outputs the rhythm pattern to the normalizing unit 14. It is noted that the rhythm inputting unit 13 may also detect the force of pushing the pushed portion. This enables the rhythm inputting unit 13 to detect the relative intensity of the rhythm.

Figure 6:
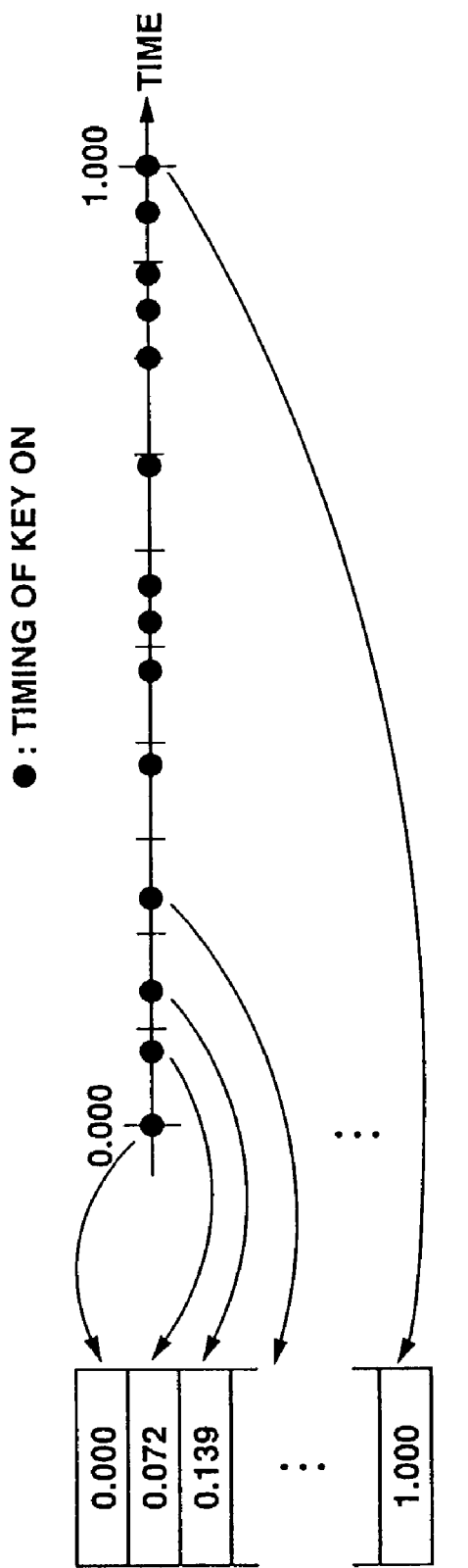
FIG. 6 illustrates normalizing processing.

For eliminating variations along the time axis of the rhythm pattern, input from the rhythm inputting unit 13, the normalizing unit 14 normalizes the rhythm pattern along the time axis. For example, the normalizing unit 14 adjusts the interval of hitting of the rhythm inputting unit 13, as shown in FIG. 6, so that it is comprised within for example one minute. When registering the input rhythm pattern on the rhythm pattern database, formed in the second storage unit 12, the normalizing unit 14 outputs the normalized rhythm pattern to a registration unit 15. The registration unit 15 registers the input rhythm pattern in a rhythm pattern database formed in the second storage unit 12. In retrieving the music number database, stored in the first storage unit 11, the normalizing unit 14 outputs a normalized rhythm pattern to the comparator 16.

The comparator 16 receives the rhythm pattern normalized by the normalizing unit 14. The comparator 16 compares the input rhythm pattern, normalized by the normalizing unit 14, to the totality of the rhythm patterns registered in the second storage unit 12, in accordance with a dynamic programming matching method, sometimes referred to below as DP matching method. That is, the comparator 16 calculates the sum total of the distances between respective elements making up the input rhythm patterns and respective elements making up the registered rhythm patterns and calculates the similarity between the input rhythm patterns and the registered rhythm patterns based on the distances. The comparator 16 calculates the distances, that is similarity, between the input rhythm pattern and the totality of the registered rhythm patterns recorded in the second storage unit 12, to output the calculated similarity to the display processing unit 22.

Figure 7:
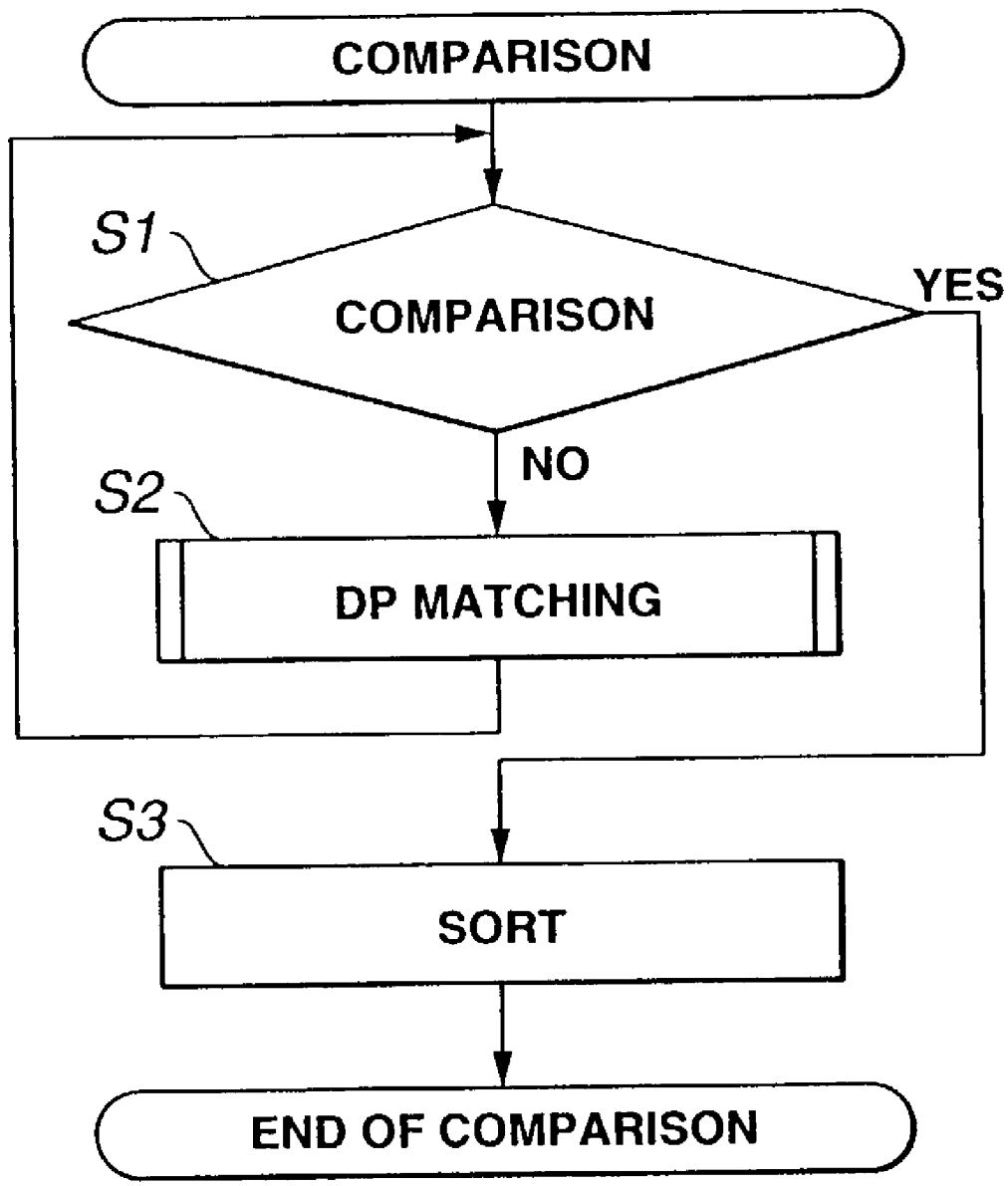
FIG. 7 is a flowchart for illustrating the sequence of comparison processing executed in a comparator unit.

Specifically, referring to FIG. 7, the comparator 16 at step S1 verifies whether or not comparison of the totality of the rhythm patterns and the input rhythm pattern has been finished. If it is found that the comparison has not been finished, the comparator 16 proceeds to step S2 and, if the comparison has been finished, the comparator 16 proceeds to step S3. At step S2, the comparator 16 compares the respective registered rhythm patterns to the input rhythm patterns, in accordance with the DP matching method, to calculate the similarity of the input rhythm patterns to the registered rhythm patterns. When the comparison of the totality of the registered rhythm patterns has been finished, the comparator 16 at step S3 outputs the results of comparison to the display processing unit 22, which display processing unit 22 then re-arrays the results of comparison in the order of the decreasing similarity to enable the information relevant to music number data to be demonstrated in the display unit 23.

Figure 8:
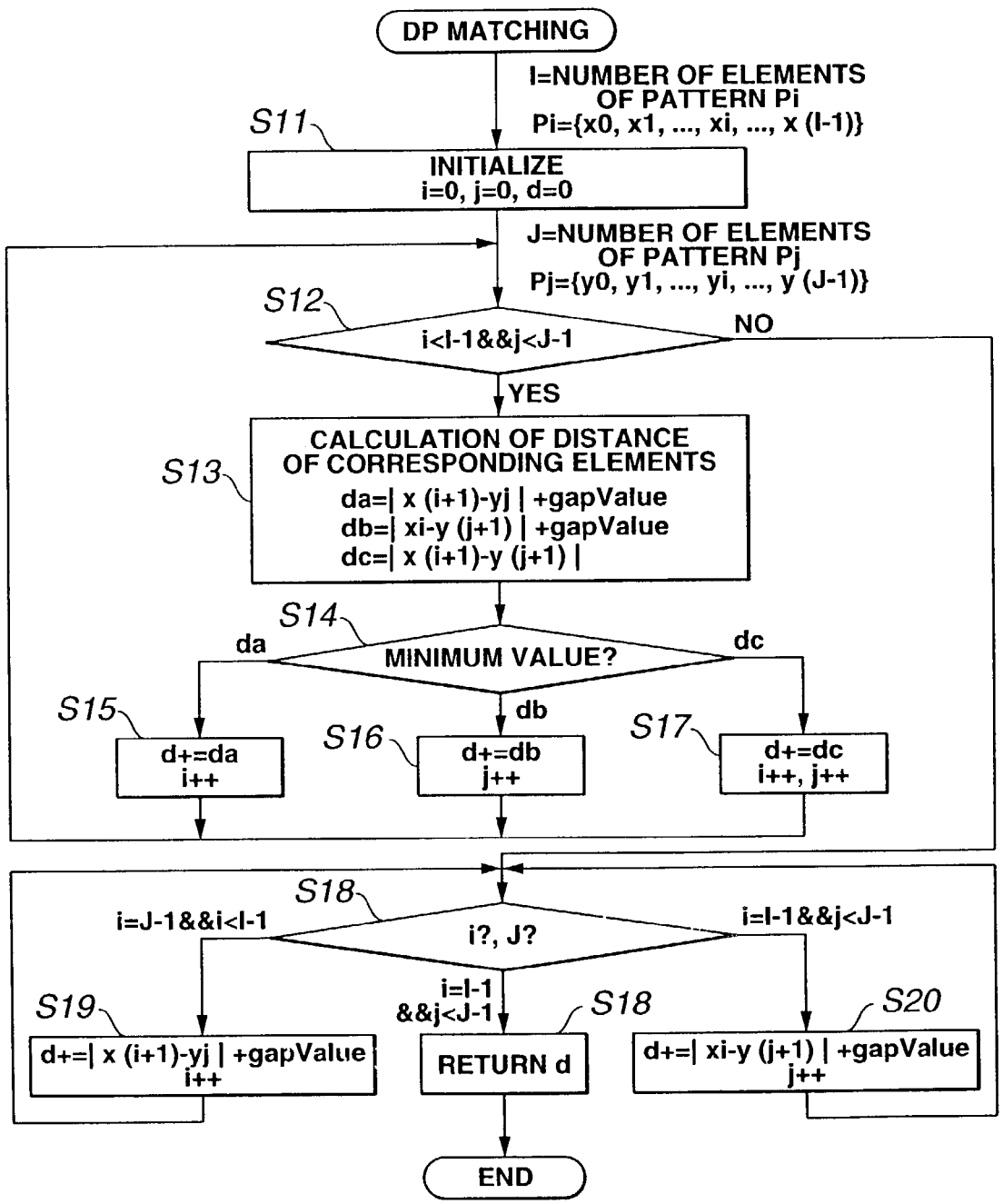
FIG. 8 is a flowchart for illustrating a DP matching method.

Referring to the flowchart of FIG. 8, the operation of the comparator 16 at step S2 of FIG. 7 is explained in detail.

In the second storage unit 12, there are pre-stored registered rhythm patterns py from one music number registered by the user to another, as a set of J time points y(j) at which a rhythm input key forming the rhythm inputting unit 13 is pressed. That is, the registered rhythm patterns py are represented by the following equation (1):

$$Py=\{y[0], y[1], \ldots, y[j], \ldots, y[J-1]\} \quad (1)$$

Meanwhile, the J time points y(j) making up the registered rhythm patterns Py are normalized. It is noted that the respective normalized time points y(j) are termed elements y(j), j is termed a pointer, the elements y(j) have the values from 0 to 1 and the pointers j have the values from 0 to (J−1).

The normalizing unit 14 normalizes the respective time points x(i) when the user pushes the rhythm input key once, as supplied from the rhythm inputting unit 13, and transiently stores the results in a memory as an input rhythm pattern Px. That is, the input rhythm pattern Px is represented by the following equation (2):

$$Px=\{x[0], x[1], \ldots, x[i], \ldots, x[I-1]\} \quad (2).$$

As in the case of the registered rhythm pattern Py, the respective normalized time points x(j) are termed elements x(j) of the input rhythm pattern Px, i is termed a pointer, and the pointers i have the values from 0 to (I−1). The number I of the elements x(i) of the input rhythm pattern Px does not necessarily have to coincide with the number J of the elements y(j) of the registered rhythm patterns Py. That is, the length of the input rhythm pattern Px, currently input by the user, may for example be shorter than the length of the registered rhythm pattern Py.

The comparator 16 finds the distance d between the input rhythm pattern Px and the selected sole registered rhythm pattern Py in accordance with the aforementioned DP matching method.

Specifically, the comparator 16 at step S11 of FIG. 8 initializes the pointers i and j and the distance d to zero.

At step S12, the comparator 16 checks whether one of two pointers i and j has not reached the final point value I−1, J−1. If one of two pointers i and j has not reached the final point value, the comparator 16 proceeds to step S13 and, if otherwise, the comparator 16 proceeds to step S18.

In order to detect to which element of the registered rhythm pattern Py corresponds one of the elements of the input rhythm pattern Px, the comparator 16 at step S13 finds three distances da, db and dc in accordance with the following equations 3, 4 and 5:

$$da=|x(i+1)-yj|+gapValue \quad (3)$$

$$db=|xi-y(j+1)|+gapValue \quad (4)$$

$$dc=|x(i+1)-y(j+1)| \quad (5).$$

In the above equations, the coefficient gapValue is the gap penalty which will be explained subsequently.

At step S14, the comparator 16 compares the three distances da, db and de, as found. If the smallest distance is da, the comparator 16 proceeds to step S15 and, if the smallest distance is db, the comparator 16 proceeds to step S16. If the smallest distance is dc, the comparator 16 proceeds to step S17.

At one of the steps S15 to S17, the comparator 16 sums the distance da to the previous distance d to set the resulting sum as the current distance d, while incrementing the pointer i by 1, to make movement. At step S16, the comparator 16 sums the distance db to the previous distance d to set the resulting sum as the current distance d, while incrementing the pointer i by 2, to make movement. At step S17, the comparator 16 sums the distance dc to the previous distance d to set the resulting sum as the current distance d, while incrementing the pointers i and j by 2, to make movement to then revert to step S12.

That is, in a loop from step S12 to step S17, the comparator 16 sets one of the three combinations of elements, that is the combination of the element x(i+1) and the element y(j+1), the combination of the element x(i) and the element y(i+1) and the combination of the element x(i+1) and the element y(j), which is closest in distance, as the element of the registered rhythm pattern Py to which corresponds the element x(i) specified by the pointer i of the input rhythm pattern Px.

Meanwhile, in the combination of the element x(i) and the element y(i+1) and in the combination x(i+1) and the element y(j), the gap penalty gapValue is introduced to absorb slight rhythm offsets in the input rhythm pattern. At step S12, the comparator 16 repeats the processing of steps S13 to S17 to cumulate the distances d within an extent in which one of the pointers i, j is not in excess of the number of elements I, J.

At the next step S18, the comparator 16 decides which of the pointers i, j has reaches the last point value I− or J−1. When the pointer j has reached the final point value J−1, the comparator 16 proceeds to step S19. When the pointer i has reached the final point value I−1, the comparator 16 proceeds to step S20. On the other hand, when both pointers i and j have reached the final point values I−1, J−1, the comparator 16 proceeds to step S21.

At step S19, the comparator 16 finds the distance da, based on the aforementioned equation (3), and sums this distance da to the distance d, while incrementing the pointer i by 2 for making movements before reverting to step S18. That is, since the pointer j has already reached the final point value J−1, in the loop comprised of the steps S18 and S19, the comparator 16 cumulates the distance values d as it causes movements of the pointer i, until the pointer i reaches the final pointer value I−1.

On the other hand, the comparator 16 at step S20 finds the distance db, in accordance with the equation 4, and sums this distance db to the distance d, while incrementing the pointer j by 2 and making movements of the pointer before reverting to step S18. That is, since the pointer i has already reached the final point value I−1 in the loop comprised of the steps S19 and S20, the comparator 16 cumulates the distance values d, as it causes movements of the pointer j, until the pointer j reaches the final pointer value J−1.

When both pointers i and j have reached the final point values, that is at step S20, the comparator 16 sets the distance d, obtained on cumulating the distance between the element of the input rhythm pattern Px and the corresponding element of the registered rhythm pattern Py, irrespective of whether the lengths of the two patterns are the same or different values, as being the distance d corresponding to the registered music number as a target for comparison.

Figure 9A:
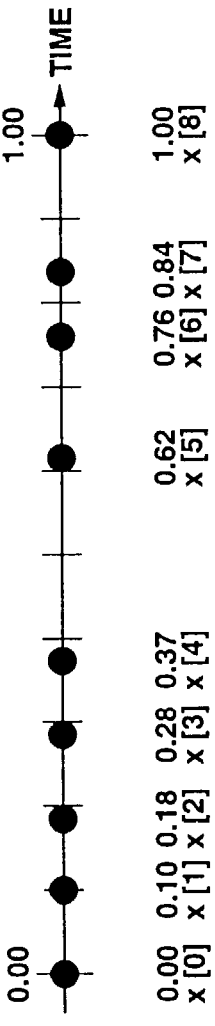
FIGS. 9A to 9C show an instance of comparison by the DP matching method of the registered rhythm pattern and the input rhythm patterns, where
Figure 9B:
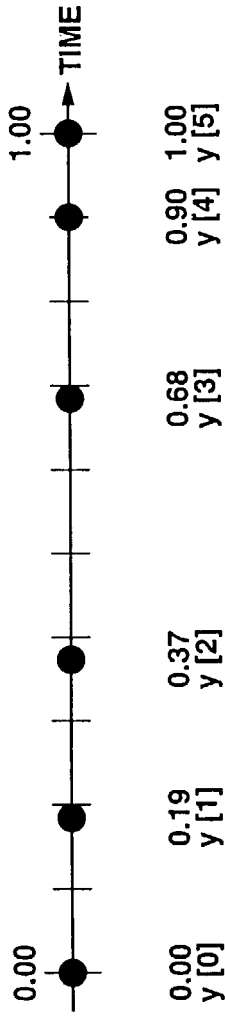
Figure 9C:
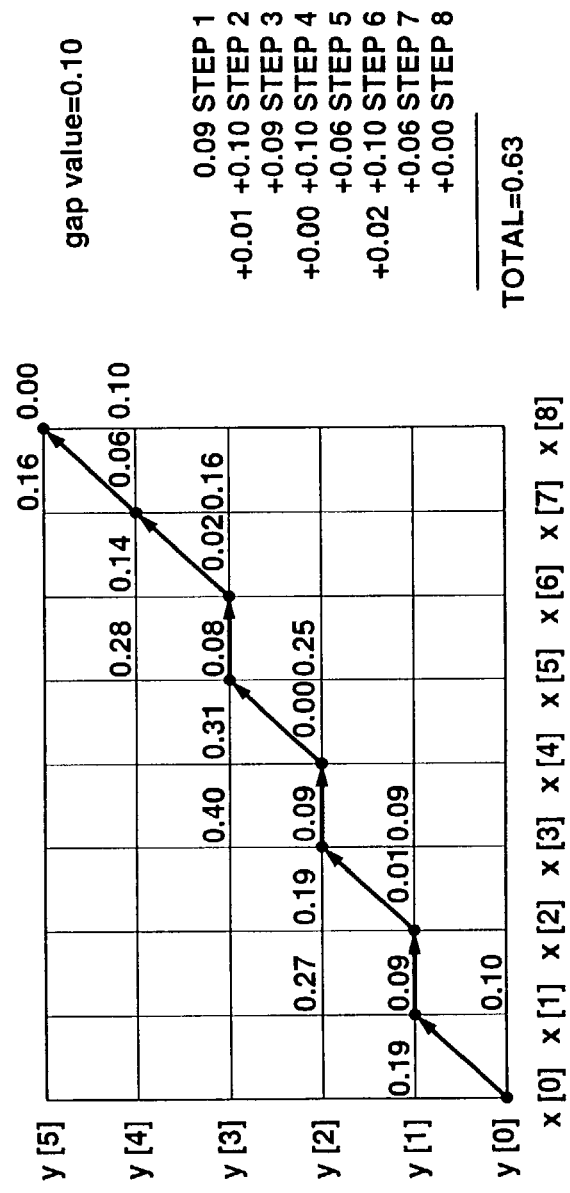

A specified instance of processing from step S13 to step S17 of FIG. 8 is explained with reference to FIGS. 9A to 9C and FIGS. 10A to 10C. Referring to FIGS. 9A to 9C, FIG. 9A shows a normalized input rhythm pattern Px (yesterday once more), FIG. 9B shows a normalized registered rhythm pattern Py (yellow submarine) and FIG. 9C illustrates the relationship between the input rhythm pattern Px and the registered rhythm pattern Py.
First Step
  da=abs(x(1))−y(0))+gapvalue=abs(0.10−0.00)+ 0.10=0.20
  db=abs(x(0))−y(1))+gapvalue=abs(0.00−0.19)+ 0.10=0.29
  dc=abs(x(1)−y(1))=abs(0.10−0.19)=0.09

Thus, at the first step, dc, which is of the smallest value, is selected.
Second Step
  da=abs(x(2))−y(1))+gapvalue=abs(0.18−0.19)+ 0.10=0.11
  db=abs(x(1))−y(2))+gapvalue=abs(0.10−0.37)+ 0.10=0.29
  dc=abs(x(2)−y(2))=abs(0.18−0.37)=0.19
  Consequently, da, which is of the smallest value, is selected at the second step.
Third Step
  da=abs(x(3))−y(1))+gapvalue=abs(0.28−0.19)+ 0.10=0.19
  db=abs(x(2))−y(2))+gapvalue=abs(0.18−0.37)+ 0.10=0.29
  dc=abs(x(3)−y(2))=abs(0.28−0.37)=0.09
  Consequently, dc, which is of the smallest value, is selected at the third step.

The above processing is repeated up to the eighth step. This cumulates the smallest values, as calculated at the respective steps, to give the distance d, that is the similarity, between the input rhythm pattern Px and the registered rhythm pattern Py, which distance or similarity is equal to 0.63, as indicated by the following equation:

$$d=0.09+0.11+0.09+0.10+0.06+0.12+0.06+0.00=0.63.$$

Figure 10A:
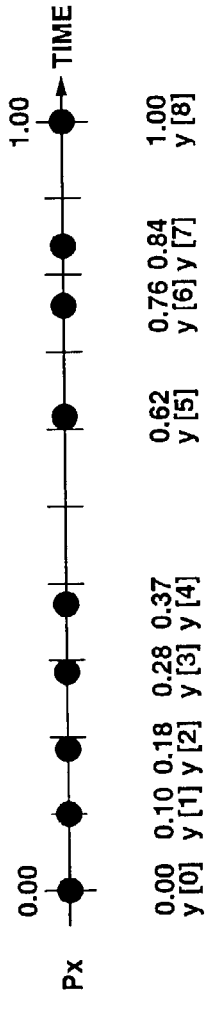
FIGS. 10A to 10C show another instance of comparison of the registered rhythm pattern and the input rhythm pattern, where
Figure 10B:
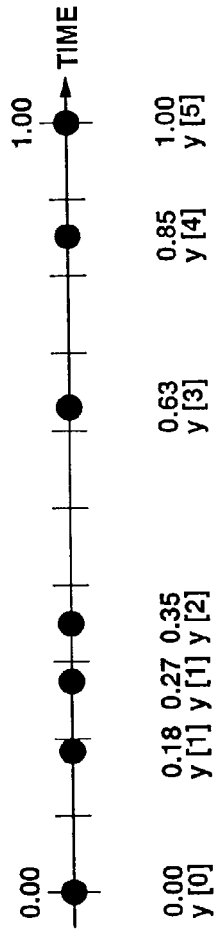
Figure 10C:
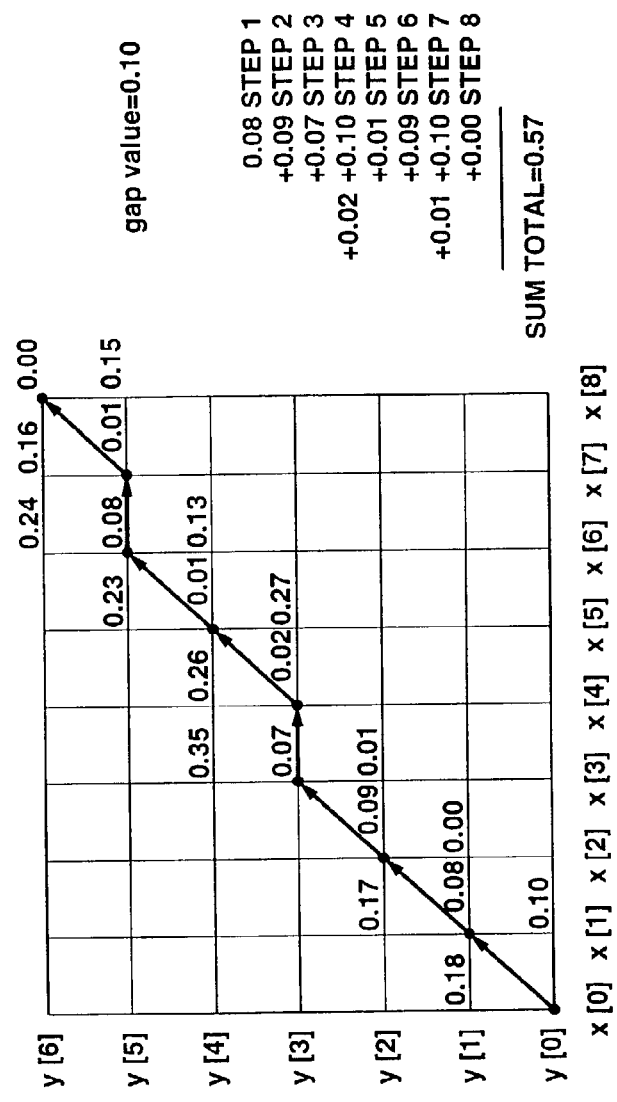

Another instance is explained with reference to FIGS. 10A to 10C. Referring to FIGS. 10A to 10C, FIG. 10A shows a normalized input rhythm pattern Px (yesterday once more), FIG. 10B shows a normalized registered rhythm pattern Py (yesterday once more) and FIG. 10C illustrates the relationship between the input rhythm pattern Px and the registered rhythm pattern Py.
First Step
  da=abs(x(1))−y(0))+gapvalue=abs(0.10−0.00)+ 0.10=0.20
  db=abs(x(0))−y(1))+gapvalue=abs(0.00−0.18)+ 0.10=0.28
  dc=abs(x(1)−y(1))=abs(0.10−0.18)=0.08
  Thus, at the first step, dc, which is of the smallest value, is selected.
Second Step
  da=abs(x(2))−y(1))+gapvalue=abs(0.18−0.18)+ 0.10=0.10
  db=abs(x(1))−y(2))+gapvalue=abs(0.10−0.27)+ 0.10=0.27
  dc=abs(x(2)−y(2))=abs(0.18−0.27)=0.09
  Consequently, dc, which is of the smallest value, is selected at the second step.
Third Step
  da=abs(x(3))−y(2))+gapvalue=abs(0.28−0.27)+ 0.10=0.11
  db=abs(x(2))−y(3))+gapvalue=abs(0.18−0.35)+ 0.10=0.27
  dc=abs(x(3)−y(3))=abs(0.28−0.35)=0.07
  Consequently, dc, which is of the smallest value, is selected at the third step.

The above processing is repeated up to the eighth step. This cumulates the smallest values, as calculated at the respective steps, to give the distance d, that is the similarity, between the input rhythm pattern Px and the registered rhythm pattern Py, which is equal to 0.57, as indicated by the following equation:

$$d=0.08+0.09+0.07+0.12+0.01+0.09+0.11+0.00=0.57$$

When the input rhythm pattern Px (yesterday once more) is input to the comparator 16, the comparator determines that the registered rhythm pattern Py (yesterday once more) of FIG. 10B, with the smallest distance d, as being the registered rhythm pattern Py, which is higher in similarity than the registered rhythm pattern Py (yellow submarine) shown in FIG. 9B.

Figure 11:
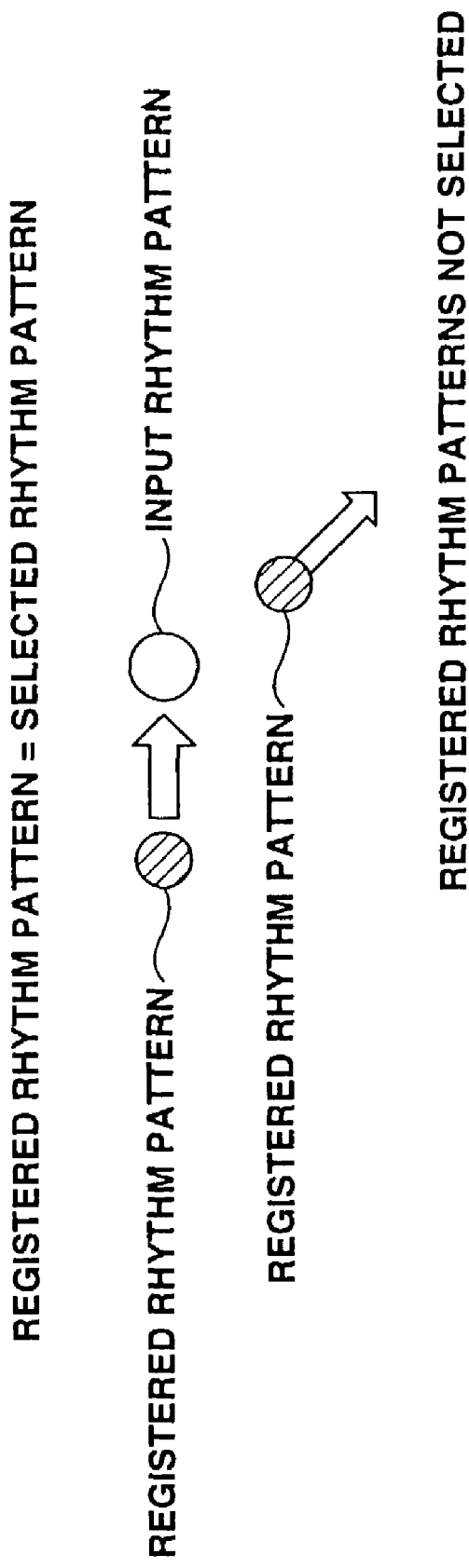
FIG. 11 illustrates the operation of a learning unit.

The learning unit 17 performs processing of raising the recognition ratio of the input rhythm pattern by the learning vector quantization (LVC) method. That is, when the music number data desired by the user has been selected from among the retrieved music number data, the learning unit 17 performs processing by the LVQ method for raising the recognition ratio of the input rhythm pattern as from the next time. Specifically, when the music number data desired by the user has been selected from the list of the retrieved results, the learning unit 17 performs weighting such as to approach the vector of the registered rhythm pattern of the selected music number data to the vector of the input rhythm pattern input to the input layer, as shown in FIG. 11. The learning unit 17 also performs weighting such as to separate the vector of the non-selected registered rhythm pattern from the input vector. By repeatedly inputting the same input rhythm pattern to the learning unit 17, it is possible to raise the recognition ratio of the input rhythm pattern, that is the retrieval hit ratio.

It should be noted that any other suitable learning algorithms than the LVQ method may also be used by the learning unit 17.

The results of comparison, calculated by the DP matching method, are input from the comparator 16 to the retrieval unit 18, as shown in FIG. 1. The retrieval unit 18 retrieves the relevant information of the music number data necessary in displaying the retrieved results in the display unit 23. If ten music numbers are demonstrated on the display unit 23 in the order of decreasing similarity, the retrieval unit 18 retrieves and extracts the relevant data, specifically, the title names or artists' names, of the music number data of upper ranking ten music numbers. The retrieval unit 18 outputs the relevant data of these music number data to the display processing unit 22. When the user has selected his or her favorite music number data, the retrieval unit 18 retrieves and extracts the music number data, based on the selected data, to output the music number data and the data relevant to the music number data to the reproducing unit 20 and to the display processing unit 22.

The operating unit 19 is responsive to user's actuation to generate an operating signal for executing the operation of the music number retrieval apparatus 10. Specifically, the operating unit 19 is made up by a replay button for reproducing music number data stored in the first storage unit 11, a forward track jump button for effectuating forward track jump, a reverse track jump button for effectuating reverse track jump, a recording button for storing music number data in the first storage unit 11, a registration button for starting the recording of the registered rhythm pattern corresponding to the music number data recorded in the first storage unit 11, a retrieval button for retrieving the music number data stored in the second storage unit 12 with the rhythm pattern and a selection button for selecting one music number data from the list of retrieved results demonstrated on the display unit 23. On actuating a given button, the operating unit 19 generates an actuating signal corresponding to the actuated button.

When reproducing the music number data, the reproducing unit 20 decodes the music number data stored in the first storage unit 11 to convert the digital signals into analog signals to output the so converted analog signals to the loudspeaker 21. Specifically, the reproducing unit 20 decodes the music number data by such systems as ATRAC 3 (Adaptive Transform Acoustic Coding 3: trademark), MPEG-2AAC (Motion Picture Expert Group 2 Advanced Audio Coding: trademark), MP3 (MPEG-1 Audio Layer 3: trademark), TwinVQ (Transform-Domain Weighted Interleave Vector Quantization: trademark), MS Audio (WMA: Windows Media Audio: trademark), or Ogg Vorbis (trademark). The reproducing unit 20 converts the decoded music number data from the digital signals into analog signals, by a D/A converter, and amplifies the resulting analog signals to output the amplified analog signals at the loudspeaker 21. It should be noted that the music number data may also be output from earphones or headphones, instead of from the loudspeaker 21.

When the user performs retrieval of music number data, the display processing unit 22 generates display data for demonstrating the retrieved results. Thus, when the retrieved results are input from the retrieval unit 18 to the display processing unit 22, the display processing unit 22 sorts the music number data in the order of decreasing similarity so that title names, artists' names and so forth will be demonstrated in the order of decreasing similarity. Moreover, when the user replays the music number data, the display processing unit 22 generates display data for demonstrating the information relevant to the music number data to be reproduced. The display processing unit 22 outputs these display data to the display unit 23. The display unit 23 is made up of a LCD (liquid crystal display), CRT (cathode-ray tube) and plural LEDs (light-emitting diodes). The display unit 23 demonstrates the list of the retrieved results on retrieving the music number data in the first storage unit 11 with the rhythm pattern, while demonstrating the information relevant to the music number data, such as the name of the number being reproduced, album name, artists' names, reproducing time, reproducing time of the recording tracks or the residual play time.

Figure 12:
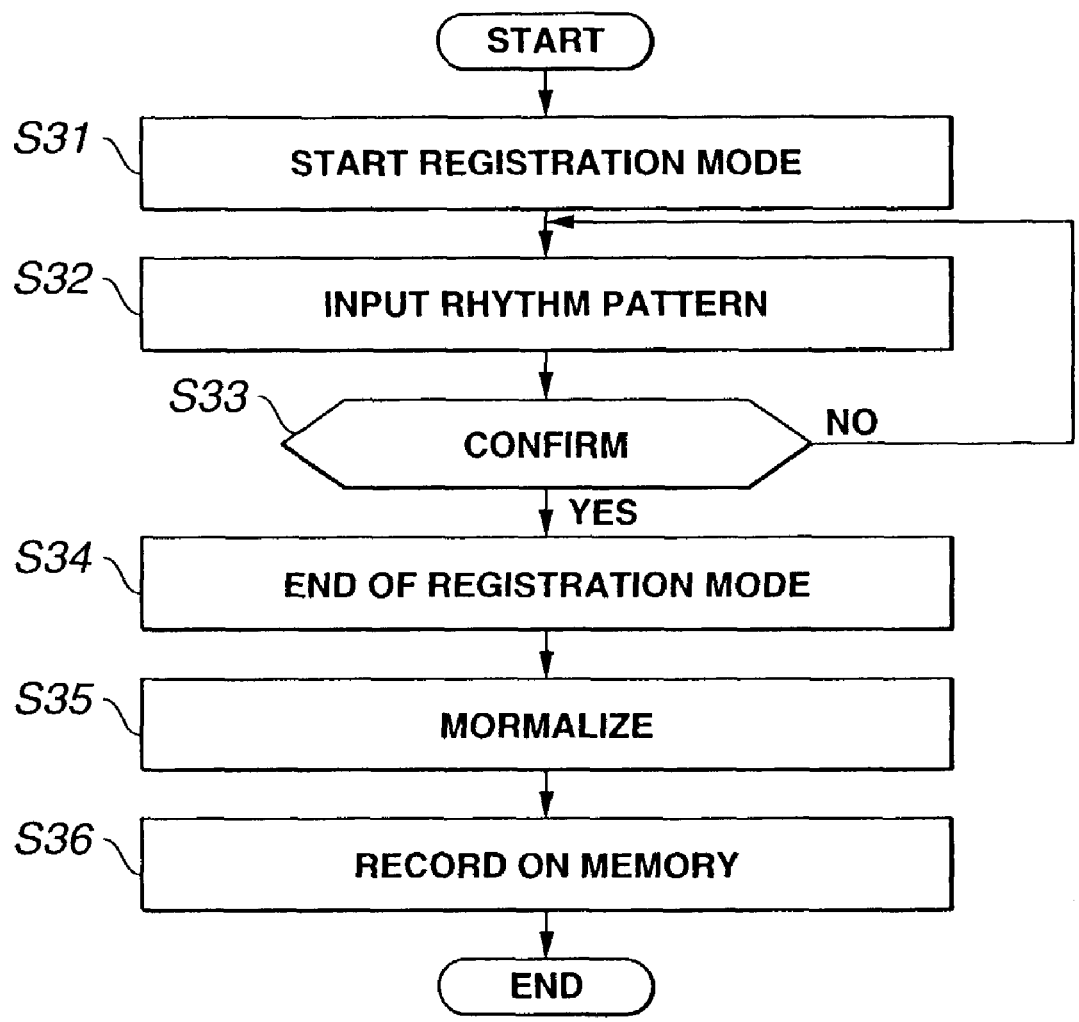
FIG. 12 is a flowchart for illustrating the sequence of registering the rhythm pattern.

The sequence of operations for registering the registered rhythm pattern used in retrieving the music numbers in the above-described music number retrieval apparatus 10 is now explained with reference to FIG. 12. First, at step S31, the user pushes the registration button for starting the recording of the registered rhythm pattern corresponding to the music number data recorded in the first storage unit 11 forming the operating unit 19. This causes the music number retrieval apparatus 10 to start its rhythm pattern registration mode.

At step S32, the user acts on the rhythm inputting unit 13 to input the rhythm pattern of the music number data, the rhythm pattern of which is to be registered, as shown in FIG. 5. The music number retrieval apparatus 10 then inputs the rhythm pattern, input at the rhythm inputting unit 13, to the normalizing unit 14. At step S33, the music number retrieval apparatus 10 demonstrates a confirmation message on the display unit 23 in order for the user to confirm whether or not the rhythm pattern as input by the user is correct. When a signal indicating that the rhythm pattern as input by the user is correct is input, the music number retrieval apparatus 10 proceeds to step S34. If conversely the user has selected re-inputting the rhythm pattern, the music number retrieval apparatus 10 reverts to step S33.

At step S34, the music number retrieval apparatus 10 terminates the rhythm pattern registration mode. At step S35, the music number retrieval apparatus 10 normalizes the rhythm pattern, by the normalizing unit 14, in order to allow for retrieval of the music number data, as shown in FIG. 6. The music number retrieval apparatus 10 at step S36 outputs the normalized rhythm pattern to the registration unit 15, which registration unit 15 stores the normalized rhythm pattern in association with the corresponding music number data stored in the first storage unit 11. By repeating the above-described sequence of operations, the registered rhythm patterns, used in retrieval, may be input to the respective music number data in the second storage unit 12.

Figure 13:
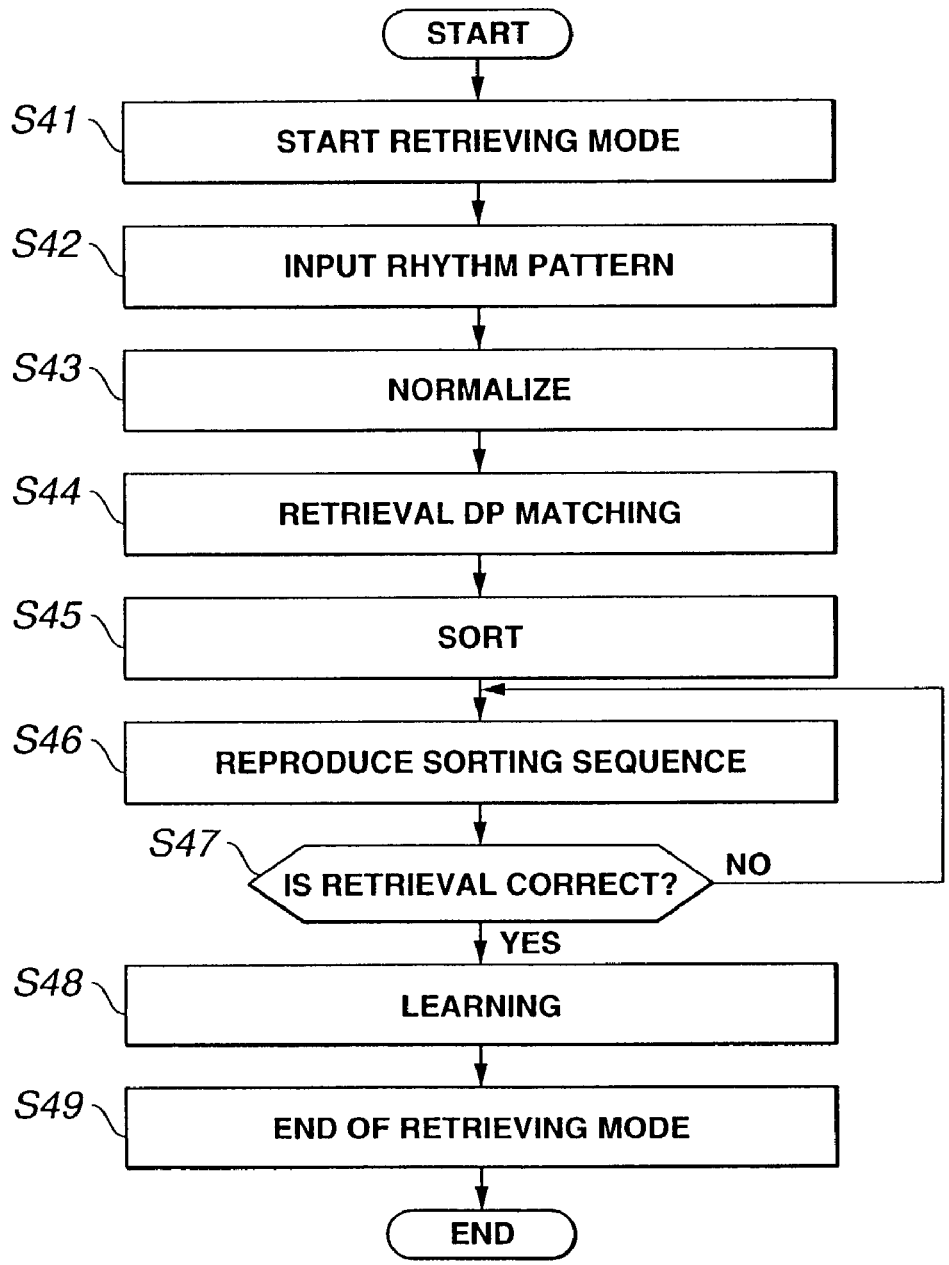
FIG. 13 is flowchart for illustrating the sequence of retrieving a rhythm pattern.

The sequence of operations for retrieving the music number data recorded in the first storage unit 11 in the music number retrieval apparatus 10 is now explained with reference to FIG. 13. First, if the user pushes the retrieval button forming the operating unit 19 at step S41, the music number retrieval apparatus 10 starts its retrieval mode for the music number data. At step S42, the user acts on the rhythm inputting unit 13 to input the rhythm pattern of the music number data to be retrieved. The rhythm inputting unit 13 then causes the rhythm pattern, as input to the rhythm inputting unit 13, to the normalizing unit 14.

At step S43, the music number retrieval apparatus 10 normalizes the input rhythm pattern, by the normalizing unit 14, shown in FIG. 6, such as to enable retrieval of the music number data. At step S44, the music number retrieval apparatus 10 outputs the normalized input rhythm pattern to the comparator 16. The comparator 16 proceeds at this step to compare the totality of the registered rhythm patterns saved in the second storage unit 12 to the input rhythm pattern, by the DP matching method, in accordance with the flowchart shown in FIGS. 7 and 8. That is, the comparator 16 finds at this step the distance between the input rhythm pattern and the totality of the registered rhythm patterns to calculate the similarity. The retrieval unit 18 retrieves and extracts the relevant information of for example ten music number data, in the order of the decreasing similarity, based on the retrieved results. The retrieval unit 18 outputs the retrieved data to the display processing unit 22.

When the comparison of the input rhythm pattern to the totality of the registered rhythm patterns by the DP matching method is finished, the music number retrieval apparatus 10 at step S45 sorts the music number data, in the display processing unit 22, in the order of the decreasing similarity, to generate display data used for displaying the retrieved results in the display unit 23. The music number retrieval apparatus 10 demonstrates title names and artists' names and so forth of for example the upper ten music number data in the display unit 23 in the order of the decreasing similarity.

The music number retrieval apparatus 10 at step S46 automatically reproduces the music number data in the order of the decreasing similarity. Meanwhile, the music number retrieval apparatus 10 may sequentially reproduce the music number data, selected by the user, with the selection button forming the operating unit 19.

At step S47, the user judges whether or not the music number data retrieved and reproduced is correct. Specifically, the music number retrieval apparatus 10 checks whether or not the decision button forming the operating unit 19 has been pushed. If the decision button has been pushed, the music number retrieval apparatus 10 proceeds to step S48 and, if otherwise, the music number retrieval apparatus 10 reverts to step S46 to reproduce the music number data of the next candidate.

At step S48, the music number retrieval apparatus 10 performs learning in the learning unit 17 of the input rhythm pattern. That is, if the retrieved music number data is decided on, the music number retrieval apparatus 10 performs weighting at the learning unit 17 so that the vector of the registered rhythm pattern of the selected music number data will approach to the vector of the input rhythm pattern, input to the input layer, as shown in FIG. 11. The learning unit 17 also performs weighting so that the vector of the registered rhythm pattern not selected will be separated from the input vector. By the same input rhythm pattern being repeatedly input to the learning unit 17 of the music number retrieval apparatus 10, it is possible to raise the recognition ratio of the input rhythm pattern, that is the recognition hit ratio. At step S49, the retrieval mode of the music number retrieval apparatus 10 is finished.

With the above-described music number retrieval apparatus 10, in which it is only necessary to input the rhythm pattern to the rhythm inputting unit 13 in retrieving the music number data recorded in the first storage unit 11, music number data can be retrieved by a simplified operation. Since the rhythm inputting unit 13 can be made smaller in size than the keyboard, the entire apparatus may be reduced in size. Moreover, in the present music number retrieval apparatus 10, in which music number data is not retrieved with the names of the music number, but the registered rhythm pattern is input with the user's vision and the music number data is retrieved using the rhythm pattern, the music number data in the first storage unit 11 can be retrieved if only the user memorizes the vision of the music number, even when the artist's name or the name of the music number is not known. Moreover, the retrieved results may further be improved by adding the artist's name or the name of the music number to the retrieval conditions when performing retrieval by the rhythm pattern. In addition, since the music number retrieval apparatus 10 is provided with the learning unit 17, the retrieval hit ratio can be raised each time the retrieval of the music number data is repeated, thereby further improving the operability.

The above-described sequence of operations can be implemented by software. In this case, it suffices if the program performing the above-described sequence of operations is recorded on an external storage device, such as a magnetic disc, a magneto-optical disc, an optical disc or an IC card, and the external storage device so formed is loaded on a drive so as to be installed on the first storage unit 11 or on the second storage unit 12. This program may also be installed on the first storage unit 11 or on the second storage unit 12 through an electrical communication network, such as ISDN network (Integrated Services Digital Network), CATV (cable television) network, optical cable network or satellite network.

The music number retrieval apparatus according to the present invention may also be realized on the hardware. That is, a music number retrieval apparatus 50 includes a memory 51, a memory control circuit 52 for controlling the memory 51, a decoder 53 for decoding music number data output by the music number data output by the memory control circuit 52, a D/A converter 54 for converting digital signals output by the decider 53 into analog signals, an amplifier 55 for amplifying analog signals output by the D/A converter 54 and paired left and right loudspeakers 56a, 56b for outputting music number data amplified by the amplifier 55. The music number retrieval apparatus 50 also includes a rhythm inputting unit 57 for inputting a rhythm pattern to be retrieved, an operating unit 58 for performing operations for recording and/or reproduction, a display unit 59 for demonstrating the retrieved results of music number data, an external interface (external I/F) 60 for connection to for example a personal computer, a CPU 61 for retrieving music number data recorded on the memory 11 based on the rhythm pattern input from the rhythm inputting unit 57, and a drive 62 on which to load for example the external storage device.

The memory 51 is equivalent to the first storage unit 11 and the second storage unit 12 and has stored therein e.g., plural music number data and registered rhythm patterns operating as retrieving keywords in retrieving the saved music number data. The memory control circuit 52 controls the operation of the memory 51 and records music number data, input from the external I/F 60, in the memory 51. Moreover, when registering the rhythm patterns of the music number data already stored in the memory 51, the memory control circuit 52 saves the rhythm patterns in the memory 51 in association with music number data.

The decoder 53, D/A converter 54 and the amplifier 55 correspond to the reproducing unit 20 described above. The decoder 53 decodes music number data, read out from the memory 51, while the D/A converter 54 converts the decoded music number data from digital signals into analog signals and the amplifier 55 amplifies the music number data converted into analog signals to output the amplified analog signals at the loudspeakers 56a, 56b.

The CPU 61 controls the entire apparatus, in such a manner that the music number data recorded in the memory 51 are sequentially reproduced, when a replay button of the operating unit 19 is pushed, forward track jump is made for one music number when a forward track jump button is pressed, and that reverse track jump is made for one music number when a reverse track jump button is pressed.

Figure 15:
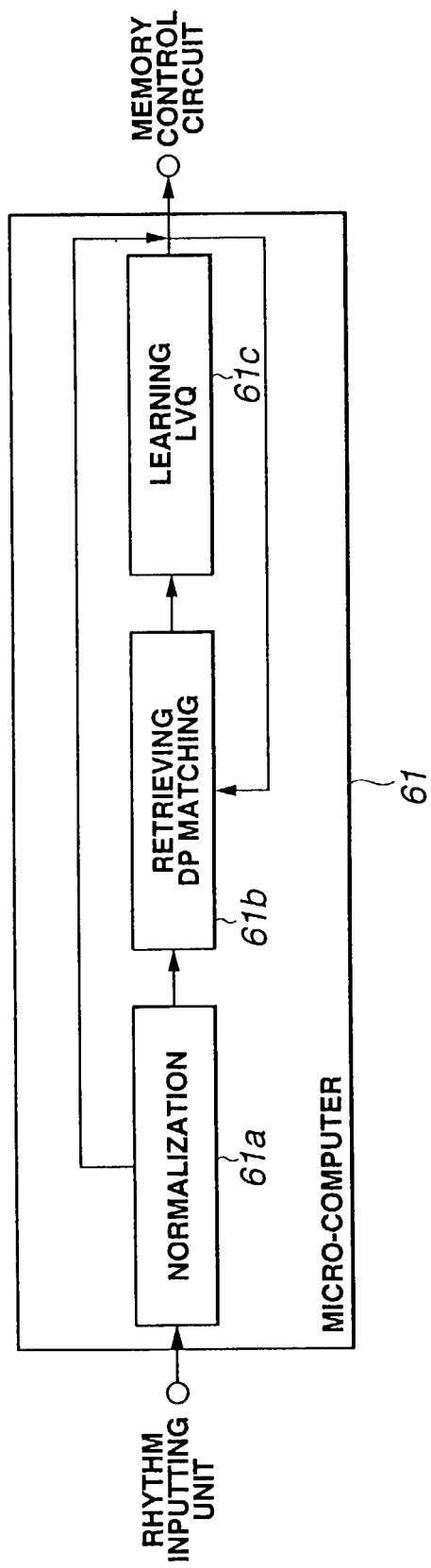
FIG. 15 is a functional block diagram of a micro-computer.

The CPU 61, reading out a computer program for retrieving music number data from the memory 51, to the internal memory, operates as a normalizing unit 61a for normalizing the rhythm pattern input from the rhythm inputting unit 17 along the time axis, while operating as a comparator 61b for comparing the input rhythm pattern, input for retrieving the music number data, to the registered rhythm pattern by the DP matching method and also operating as a processing learning unit 61c for raising the recognition ratio of the input rhythm pattern by the learning vector quantization method, as shown in FIG. 15.

Figure 14:
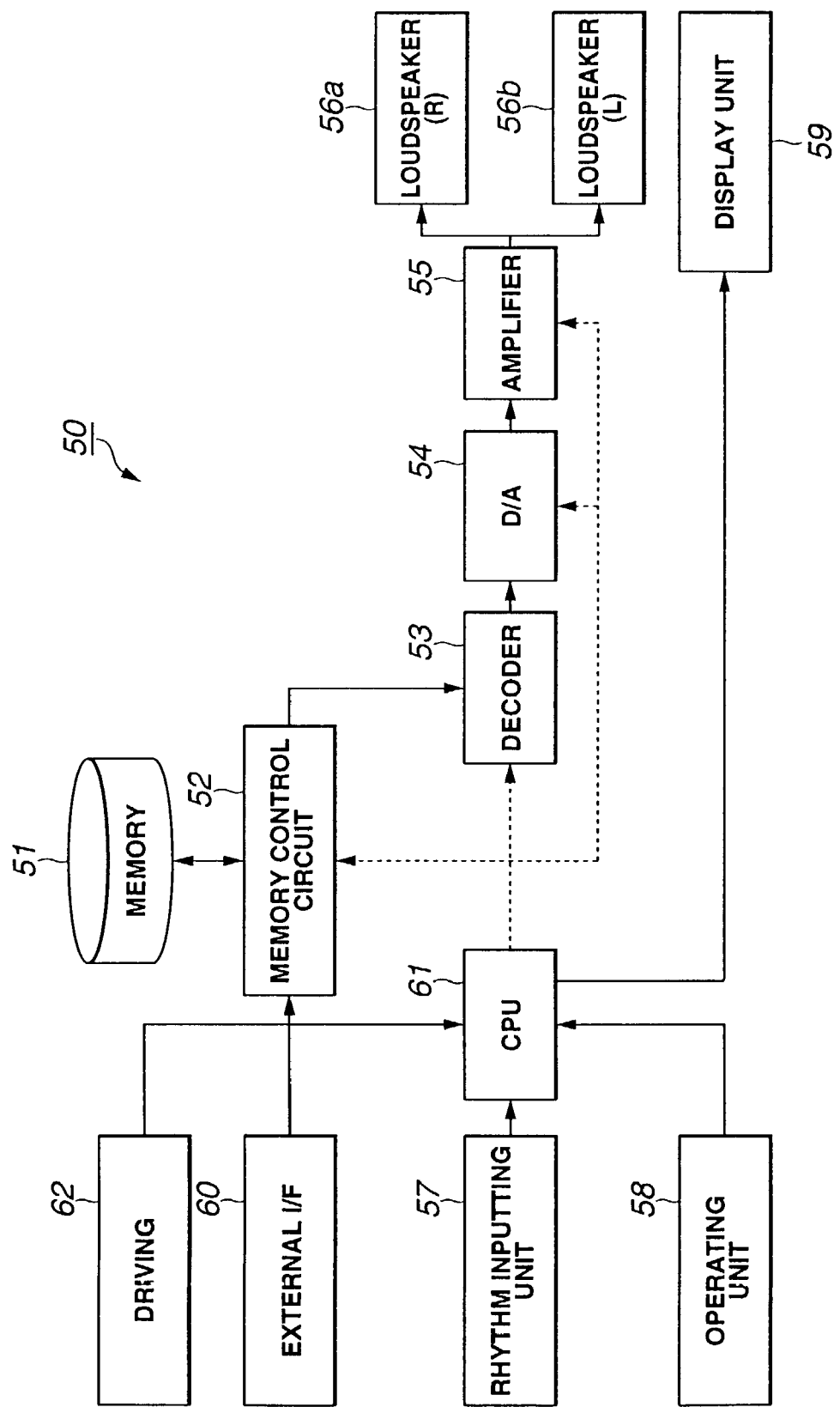
FIG. 14 is a block diagram for illustrating the structure of the hardware of a music number retrieving apparatus.

When constructed by the hardware, the music number retrieval apparatus 10 may be constructed as the music number retrieval apparatus 50 shown in FIG. 14 to manifest similar operation and results.

Referring to the drawings, the music number retrieving system according to the present invention is explained in detail.

Figure 16:
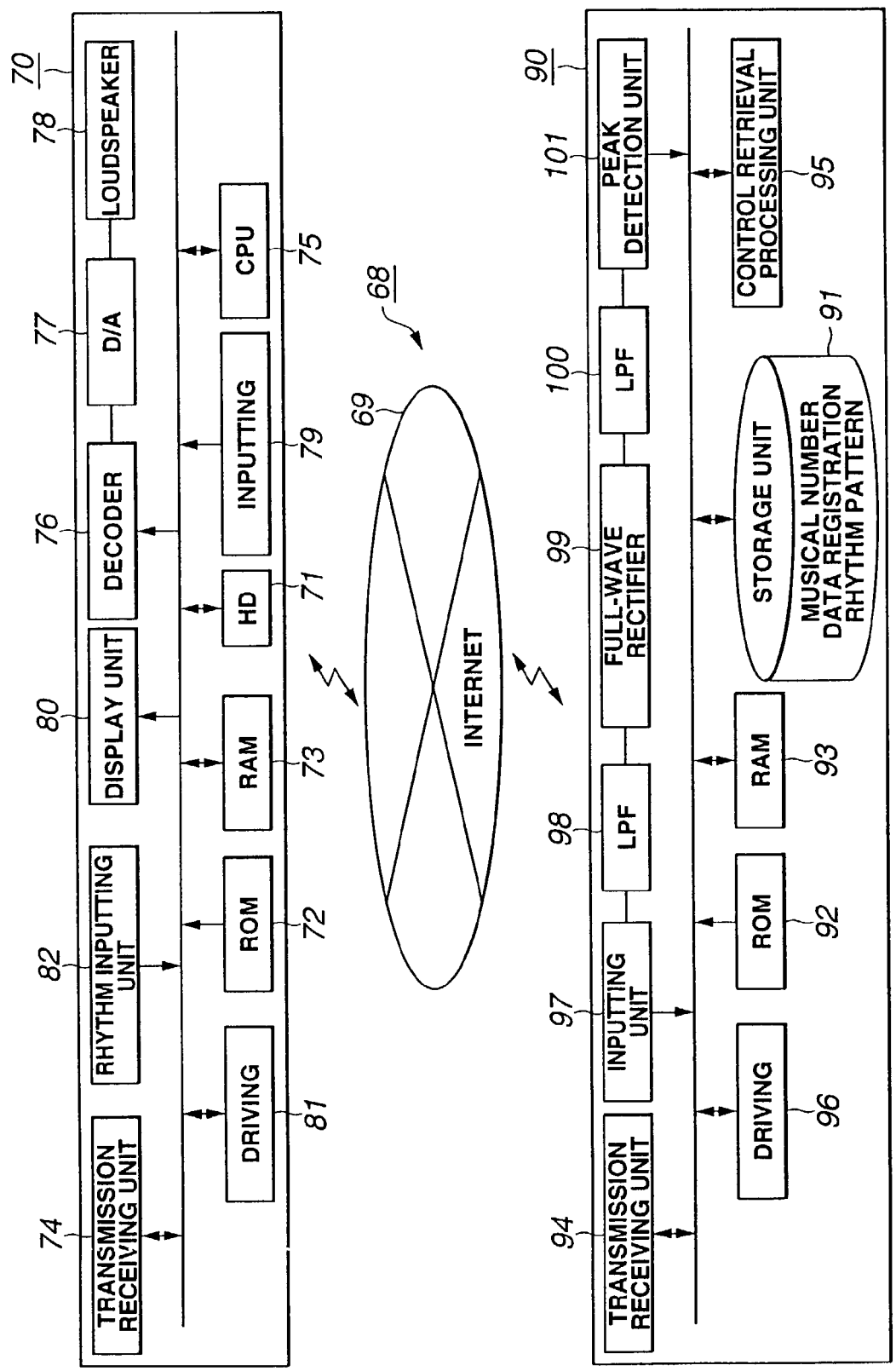
FIG. 16 illustrates a music number retrieving system for retrieving music number data stored in a server device from a personal terminal device over a network.

Referring to FIG. 16, a music number retrieving system 68 includes a personal terminal device 70 for downloading music number data over a network 69, such as Internet, and a server device 90 in which music number data are stored and which sends out music number data on demand from the personal terminal device 70. The personal terminal device 70 and the server device 90 are interconnected over an electrical communication network, such as ISDN (Integrated Services Digital Network), CATV (cable television) or an optical cable network.

The personal terminal device 70, which is substantially of the same structure as the routine personal computer, includes a hard disc (HD) 71, operating as a storage unit for saving e.g., music number data, in which there are also stored various application programs, such as a browser retrieval program for browsing home pages provided in the server device 90, and a read-only memory (ROM) 72 in which there is stored a control program for controlling the overall operations. The personal terminal device 70 also includes a random access memory (RAM) 73, loaded with a program stored in the HD 71 or in the ROM 72, a transmitter/receiver 74 for transmitting/receiving data with a server device 80, and a central processing unit (CPU) 75 for controlling the overall operations based on the program loaded on the RAM 73.

The personal terminal device 70, as a recording and/or reproducing unit for music number data, includes a decoder 76 for decoding music number data, a D/A converter 77 for converting the music number data, decoded by the decoder 76, from digital signals into analog signals, and a loudspeaker 78 for outputting the music number data converted into analog signals as a music number. The personal terminal device 70 also includes an input operating unit 79, made up by a keyboard, a mouse, a touch panel and so forth, for performing an inputting operation, a liquid crystal display panel for demonstrating a home page and so forth, downloaded from the server device 90, a display unit 80 formed e.g., by a cathode ray tube (CRT), a driver 81 on which is loaded an external storage device, having recorded thereon music number data or computer programs, such as an optical disc, a magneto-optical disc, a magnetic disc, an IC card, a tape cassette or a disc cartridge, and a rhythm inputting unit 82 for inputting rhythm patterns of music number data to be retrieved.

When a user inputs a booting command from an input operating unit 79 for booting a desired application program, stored in the HD 71, the CPU 75 reads out necessary programs from the HD 71 or the ROM 72 to the RAM 73, for executing the program.

For browsing the home page opened on the server device 90, the user inputs a URL (uniform resource locator) indicating the site of the home page, using the input operating unit 79, the CPU 75 executes a browser retrieving program or a transmission protocol, such as TCP/IP (transmission control protocol/internet protocol) to access the server device 90 to download the relevant home page for display on the display unit 80.

The HDD 71 has stored therein various music number data. When reproducing music number data, the CPU 75 reads out music number data from the HDD 71 to output the music number data to the decoder 76, which then decodes the music number data in accordance with a predetermined format. Specifically, the reproducing unit 20 decodes the music number data by such systems as ATRAC 3 (Adaptive Transform Acoustic Coding 3: trademark), MPEG-2 AAC (Motion Picture Expert Group 2 Advanced Audio Coding: trademark), MP3 (MPEG-1 Audio Layer 3: trademark), TwinVQ (Transform-Domain Weighted Interleave Vector Quantization: trademark), MS Audio (WNA: Windows Media Audio: trademark), or Ogg Vorbis (trademark). The music number data, decoded by the decoder 76, is converted by the D/A converter 77 from the digital signals into analog signals which are output at the loudspeaker 78. It should be noted that the music number data may also be output from earphones or headphones, instead of from the loudspeaker 78.

The personal terminal device 70 is also able to access the server device 90 to receive the rhythm pattern for retrieving music number data at a rhythm inputting unit 82. This rhythm inputting unit 82 is configured similarly to the rhythm inputting unit 13 of the music number retrieval apparatus 10 described above. When the rhythm pattern of the music number data to be retrieved on accessing the server device 90 is input at the rhythm inputting unit 82, the CPU 75 normalizes the rhythm pattern with the time axis to save the normalized rhythm pattern as an input rhythm pattern in the HD 71. When the CPU 75 accesses the server device 90 to retrieve music number data, the input rhythm pattern is read out from the HD 71 to transmit the so read out input rhythm pattern from the transmission/receipt unit 74 to the server device 90.

On receipt of the list of the retrieved results from the server device 90, the personal terminal device 70 demonstrates the received list on the display unit 80. Using a mouse, forming the input operating unit 79, the user selects one music number data from the list of the retrieved results displayed on the display unit 80. The personal terminal device 70 sends the selection signal for the music number data to the server device 90. Moreover, the personal terminal device 70 receives the music number data corresponding to the selection signal from the server device 90 to save the so received data in e.g., the HD 71. Thus, the user is able to reproduce the music number data, saved in the HD 71, at any desired time.

Meanwhile, in the present personal terminal device 70, an application program as necessary may be installed by loading an external storage device, which holds the application program, in the drive 81, and by reading out the program, or by downloading the application program from the transmission/receipt unit 74.

The server device 90 for retrieving the music number data based on the input rhythm pattern transmitted from the personal terminal device 70 is owned by a superintendent furnishing the present services, and is configured similarly to the ordinary computer. Thus, the server device 90 includes a storage unit 91, having stored therein the home pages, various application programs or music number data, a ROM 92 having stored therein control programs for controlling the overall operations, a RAM 93 loaded with programs, stored in the storage unit 91 and in the ROM 92, and a transmission/receipt unit 94 for transmitting/receiving data with the personal terminal device 70. The server device 90 also includes a controller 95 for controlling the overall operations based on the programs stored in the storage unit 91 and in the ROM 92, and a driver 96 loaded with the external storage device.

The server device 90 also includes, as rhythm extracting units for automatically extracting rhythm patterns of music number data, an inputting unit 97, a low-pass filter (LPF) 98, a full-wave rectifier 99, an LPF 100 and a peak detection unit 101. The inputting unit receives music number data on connection to for example a microphone or an audio equipment. The LPF 98 extracts signals of low range rhythm musical instruments, such as base guitar or a drum, from the music number data. The full-wave rectifier full-wave rectifies components output from the LPF 98. The LPF 100 extracts the amplitude envelope of the low-range rhythm musical instrument and the peak extraction unit 101 detects peaks of the envelope of the rhythm instrument.

On receipt of the music number data from the inputting unit 97, the server device 90 saves the music number data in the storage unit 91. Simultaneously, the music number data sent to the inputting unit 97 is input to an LPF 88 having a cut-off frequency of for example 100 to 250 Hz. The LPF 98 extracts signal components of the low-range rhythm instrument, such as base guitar, to output the so extracted signal components to the full-wave rectifier 99. The full-wave rectifier 99 and the LPF 100, having the cut-off frequency of for example 10 to 30 Hz, extract peaks of the extracted amplitude envelope of the low-range rhythm instrument. The peak detection unit 101 detects the peak of the envelope of the extracted amplitude of the low-range rhythm instrument. This forms the time points when the low-range rhythm instrument is struck and a rhythm pattern of the corresponding music number data. The controller 95 then normalizes the rhythm pattern along the time axis direction to eliminate fluctuations to save the normalized rhythm pattern in the storage unit 91. When recording new music number data in the storage unit 91, the controller 95 saves the new music number data as it associates the new music number data with the registered rhythm pattern.

On receipt of the rhythm pattern from the personal terminal device 70, the server device 90 retrieves the music number data, responsive to the rhythm pattern, in accordance with the DP matching method. That is, the controller 95 reads-in the preset computer program by the storage unit 91 to operate as the aforementioned comparator and retrieval unit. The server device 90 sends the list of the retrieved results to the personal terminal device 70. On receipt from the personal terminal device 70 of the selection signal from the list of the retrieved results, the server device 90 sends the relevant music number data to the personal terminal device 70.

With the present server device 90, an external storage device, holding the necessary application program, may be loaded on the driver 96 and reading out. Alternatively, the application program can be installed on downloading it from the transmission/receipt unit 94.

Figure 17:
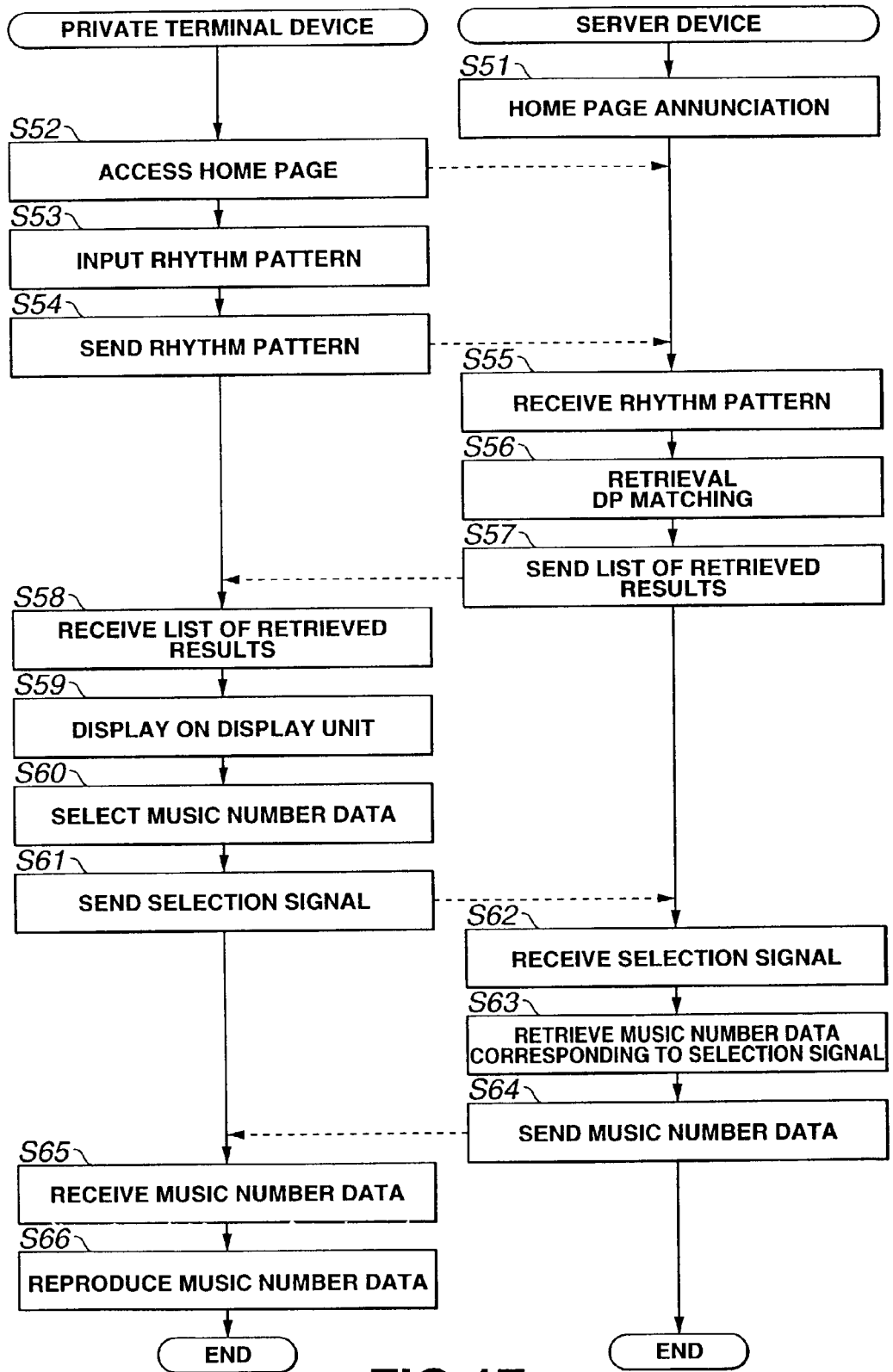
FIG. 17 is a flowchart for illustrating a sequence of operations in retrieving the music number data stored in the server device in the personal terminal device.

The sequence of operations in retrieving music number data, stored in the server device 90, in the personal terminal device 70, is hereinafter explained with reference to FIG. 17. First, the server device 90 at step S51 manifests a home page which furnishes the present services. The home page sends rhythm patterns to clarify that desired music number data can be retrieved. If the personal terminal device 70 at step S52 designates a preset URL to access the home page. This downloads and demonstrate the home page on the display unit 80.

At step S53, the user acts on the rhythm inputting unit 82 to input the rhythm patterns. The personal terminal device 70 normalizes the rhythm patterns input at the rhythm inputting unit 82 to store the normalized rhythm patterns in the HD 71. When the user clicks a transmission button provided on the home page demonstrated on the display unit 80, by acting on the input operating unit 79, the personal terminal device 70 at step S54 sends the rhythm patterns stored in the HD 71 to the server device 90.

On receipt of the rhythm patterns, transmitted from the personal terminal device 70 at step S55, the server device 90 retrieves at step S56 the music number data stored in the unit 91 based on the rhythm pattern sent from the personal terminal device 70. Specifically, the controller 95 retrieves the music number data, based on the program stored in the storage unit 91, in accordance with the sequence shown in FIGS. 7 and 8, that is by the DP matching method. That is, the controller 95 proceeds to compare the registered rhythm patterns of the totality of the music number data stored in the unit 91 to the rhythm pattern transmitted from the personal terminal device 70.

If the input rhythm pattern is of a length different from the sample length, such as when the registered rhythm pattern has a length corresponding to the length of one music number, the totality of the samples are sequentially DP-matched, such as by detecting the number of samples n of the input rhythm pattern, extracting the same samples (0, n) from the registered rhythm pattern to effect DP matching, and by then extracting the same samples (1, n+1) to effect DP matching, and the maximum matching degree is stored as the matching degree of the registered rhythm pattern.

The controller 95 at step S57 sorts the music number data in the sequence of the decreasing similarity with respect to the input rhythm pattern and prepares the list of the retrieved results. The server device 90 at step S57 sends the list of the retrieved results to the personal terminal device 70. Meanwhile, the server device 90 may also receive the rhythm patterns not normalized from the personal terminal device 70 to normalize the rhythm patterns from the personal terminal device 70 prior to retrieval to reduce the processing volume in the personal terminal device 70.

On receipt of the list of the retrieved results from the server device 90 at step S58, the personal terminal device 70 demonstrates the list of the retrieved results in the display unit 80. The user is able to view the list of the retrieved results, in which the names of the music numbers, for example, of the music number data have been sorted in the sequence of the falling similarity, so that the user is able to select the music number data the or she has desired. The personal terminal device 70 at step S60 selects one music number data, based on the user's operation on the input operating unit 79. If then the user performs the sending operation, the personal terminal device 70 at step S61 sends a selection signal, inclusive of the ID of the music number data, as selected, to the server device 90.

On receipt of a selection signal from the personal terminal device 70 at step S62, the server device 90 at step S63 retrieves the music number data specified by the user, based on the ID of the music number data contained in the selection signal. When the retrieval comes to a close, the server device 90 at step S64 sends the music number data, as specified by the user, to the personal terminal device 70.

On receipt of the music number data from the server device 90 at step S64, the personal terminal device 70 saves the music number data in for example the HD 71. The personal terminal device 70 at step S65 reproduces the music number data responsive to the user's operation on the input operating unit 79.

With the above-described music number retrieving system 68, in which, in retrieving the music number data recorded in the server device 90, it is only sufficient to input the rhythm pattern in the rhythm inputting unit 82, music number data can be retrieved by a simplified operation. Moreover, since the rhythm inputting unit 82 can be smaller in size than e.g., the keyboard, the personal terminal device 80 can be reduced in size. Moreover, in the present music number retrieving system 68, the music number data is retrieved based not on the names of the music numbers, but on the rhythm pattern owned by the user, the music number data in the server device 90 can be retrieved if the user is not aware of the artist's name or the name of the music number but memorizes a vision of the music number, that is the rhythm pattern. Moreover, in making retrieval based on the rhythm pattern, artist's name or the name of the music number can be added to the retrieving conditions to achieve more favorable results of retrieval.

Meanwhile, the server device 90 may used the LVQ method in combination, as described above. The music number retrieving system 68 may be used as a karaoke system by installing the personal terminal device 70 in e.g., a karaoke box. In this case, retrieval can be made readily by the user inputting the rhythm pattern of the music number the or she is desirous to sing in accordance with the above-described sequence of operations. In the karaoke device, equivalent to the personal terminal device 70, the downloaded music number data is separated into music number data and the lyric data and the lyric data is demonstrated on a display unit in keeping with the music number data. The music number retrieving system 68 may also be used in case the user desirous to purchase music number data over the network 69 retrieves the desired music number data.

Although the foregoing description of the present invention has been made in connection with retrieval of the music number data, this is not limitative, such that the present invention can be applied to retrieval of various content data such as motion picture data or game software. In retrieving the motion picture data, for example, it is sufficient if the title of the motion picture, name of the movie maker, star actor or star actress is used as the rhythm pattern, operating as a retrieval keyword.

INDUSTRIAL APPLICABILITY

According to the present invention, content data, such as music number data recorded in the storage means, can be retrieved by simply inputting rhythm patterns in inputting means. That is, according to the present invention, the content data in a memory unit can be retrieved if the artist's name or the title name is not known to the user but if the user memorizes the vision, that is the rhythm pattern, of the content data. Moreover, since the content data can be retrieved by simply providing a component part smaller in size than the keyboard in the main body unit, the apparatus can be prevented from being bulky in size to enable the use of the present invention for a portable recording and/or reproducing apparatus.

The invention claimed is:

1. A content retrieval apparatus comprising:
    storage means for storing a plurality of content data, each content data having a plurality of retrieval keywords and each retrieval keyword having a registered rhythm pattern;
    a single inputting means for inputting, by switching between only a first state and a second state, an input rhythm pattern;
    controlling means for retrieving content data stored in the storage means by comparing the input rhythm pattern to a registered rhythm pattern of a retrieval keyword; and
    informing means for providing information relevant to the content data retrieved by the controlling means.

2. The content retrieval apparatus according to claim 1, wherein the controlling means normalizes the input rhythm pattern and compares a normalized input rhythm pattern to a plurality of normalized registered rhythm patterns stored in the storage means.

3. The content retrieval apparatus according to claim 2, wherein the controlling means compares, using a dynamic programming matching method, the normalized input rhythm pattern to the normalized registered rhythm patterns stored in the storage means.

4. The content retrieval apparatus according to claim 1, wherein the controlling means detects the plurality of registered rhythm patterns which are stored in the storage means and which are similar to the input rhythm pattern and retrieves plural content data corresponding to the plurality of registered rhythm patterns.

5. The content retrieval apparatus according to claim 4, further comprising:
    selection means for selecting one of the plurality of content data, responsive to a user input, the selection means increasing a recognition ratio of the input rhythm pattern by performing a weighting such that the registered rhythm pattern corresponding to the content data selected by the selection means will approach the input rhythm pattern and such that the plurality of registered rhythm patterns corresponding to the plurality of content data other than the selected content data will be separated from the input rhythm pattern.

6. The content retrieval apparatus according to claim 1, wherein the content data is music number data.

7. The content retrieval apparatus according to claim 6, further comprising:
    extracting means for extracting at least a fraction of the music number data, the fraction of the music number data extracted being registered in the storage means.

8. The content retrieval apparatus according to claim 1, wherein the input rhythm pattern is a title rhythm pattern of the content data.

9. A content data retrieving method for retrieving content data from a plurality of content data, the method comprising:
    inputting, using a single inputting device, a rhythm pattern of a retrieval keyword by switching between only a first state and a second state of the inputting device;
    comparing the input rhythm pattern to a registered rhythm pattern of a retrieval keyword, wherein each content data has a plurality of retrieval keywords and each retrieval keyword has a registered rhythm pattern;

identifying content data based on a result of the comparison;

retrieving the identified content data; and providing information pertinent to the content data retrieved.

10. The content retrieving method according to claim 9, wherein comparing the input rhythm pattern further comprises:

normalizing the input rhythm pattern; and comparing the normalized input rhythm pattern to a plurality of normalized registered rhythm patterns.

11. The content retrieving method according to claim 10, wherein comparing the normalized input rhythm pattern further comprises:

comparing the normalized input rhythm pattern by a matching method to the plurality of normalized registered rhythm patterns stored in the storage means.

12. The content retrieving method according to claim 9, wherein retrieving the identified content data further comprises:

detecting the plurality of registered rhythm patterns which are stored in the storage means and which are similar to the input rhythm pattern; and retrieving plural content data corresponding to the plurality of registered rhythm patterns.

13. The content retrieving method according to claim 9, wherein the content data is music number data.

14. The content retrieving method according to claim 13, further comprising:

extracting at least a fraction of the music number data; and registering the extracted fraction in the storage means.

15. The content retrieving method according to claim 13, further comprising:

selecting one of the plurality of content data, responsive to a user input; and increasing a recognition ratio of the input rhythm pattern by performing a weighting such that the registered rhythm pattern corresponding to the content data selected by the selection means will approach the input rhythm pattern and such that the plurality of registered rhythm patterns corresponding to the plurality of content data other than the selected content data will be separated from the input rhythm pattern.

16. The content retrieving method according to claim 9, wherein the input rhythm pattern is a title rhythm pattern of the content data.

17. A computer-readable storage medium, including program instructions which, when executed by a processor, performs a method of retrieving content data from a plurality of content data, the method comprising:

retrieving identified content data stored in a storage means based on an input rhythm pattern of a retrieval keyword, the input rhythm pattern comprising changes between only a first state and a second state along a time axis;

comparing the input rhythm pattern to a registered rhythm pattern of a retrieval keyword, wherein each content data has a plurality of retrieval keywords and each retrieval keyword has a registered rhythm pattern;

identifying content data based on a result of the comparison; and providing information pertinent to the content data retrieved.

18. The storage medium according to claim 17, wherein the method further comprises:

normalizing the input rhythm pattern; and comparing the normalized input rhythm pattern to a plurality of normalized registered rhythm patterns.

19. The storage medium according to claim 18, wherein comparing the normalized input rhythm pattern further comprises:

comparing, using a dynamic programming matching method, the normalized input rhythm pattern to a plurality of normalized registered rhythm patterns stored in the storage means.

20. The storage medium according to claim 17, wherein retrieving identified content data further comprises:

detecting the plurality of registered rhythm patterns which are stored in the storage means and which are similar to the input rhythm pattern; and retrieving plural content data corresponding to the plurality of registered rhythm patterns.

21. The storage medium according to claim 17, wherein the content data is music number data.

22. The storage medium according to claim 21, wherein the method further comprises:

extracting at least a fraction of the music number data; and registering the extracted fraction in the storage means.

23. The storage medium according to claim 17, wherein the input rhythm pattern is a title rhythm pattern of the content data.

24. A communication system comprising:

a single inputting means for inputting, by switching between only a first state and a second state, a rhythm pattern of a retrieval keyword for content data, each content data having a plurality of retrieval keywords and each retrieval keyword having a registered rhythm pattern;

first communication means for transmitting the input rhythm pattern;

second communication means for receiving the input rhythm pattern transmitted from the first communication means;

storage means for storing a plurality of content data;

comparing means for comparing the input rhythm pattern to a registered rhythm pattern of a retrieval keyword;

retrieving means for retrieving the content data stored in the storage means based on the input rhythm pattern received by the second communication means; and recording and/or reproducing means for receiving the content data complying with results of retrieval of the retrieval means transmitted by the second communication means, by the first communication means, and for recording and/or reproducing the content data.

25. The communication system according to claim 24, wherein the retrieving means retrieves the content data stored in the storage means based on the results of the comparison by the comparing means.

26. The communication system according to claim 25, further comprising:

normalizing means for normalizing the input rhythm pattern received by the second communication means, and wherein the comparing means compares the normalized input rhythm pattern to the plurality of registered rhythm patterns stored in the storage means in association with the content data.

27. The communication system according to claim 26, wherein the comparing means compares, using a dynamic programming matching method, the normalized input rhythm pattern to a plurality of normalized registered rhythm patterns stored in the storage means.

28. The communication system according to claim 25, wherein the retrieving means detects the plurality of registered rhythm patterns which are stored in the storage means and which are similar to the input rhythm pattern and retrieves plural content data corresponding to the plurality of registered rhythm patterns.

29. The communication system according to claim 28, further comprising:
  selection means for selecting one of the plurality of content data, responsive to a user input; and
  means for increasing a recognition ratio of the input rhythm pattern by performing a weighting such that the registered rhythm pattern corresponding to the content data selected by the selection means will approach the input rhythm pattern and such that the plurality of registered rhythm patterns corresponding to the plurality of content data other than the selected content data will be separated from the input rhythm pattern.

30. The communication system according to claim 24, wherein the content data is music number data.

31. The communication system according to claim 30, further comprising:
  extraction means for extracting at least a fraction of the music number data stored in the storage means; and
  registration means for registering an extracted fraction of the music number data in the storage means.

32. A communication method comprising:
  inputting, by switching between only a first state and a second state of a single inputting device, a rhythm pattern of a retrieval keyword for content data, each content data having a plurality of retrieval keywords and each retrieval keyword corresponding to a registered rhythm pattern;
  transmitting the input rhythm pattern;
  receiving the input rhythm pattern as transmitted;
  storing a plurality of content data in storage means;
  retrieving the content data stored in the storage means based on the input rhythm pattern as received;
  comparing the input rhythm pattern to a registered rhythm pattern of a retrieval keyword;
  receiving the content data complying with results of retrieval; and
  recording and/or reproducing the content data as received.

33. The communication method according to claim 32, wherein the content data is retrieved based on the results of comparing an input rhythm pattern to a plurality of registered rhythm patterns.

34. The communication method according to claim 33, further comprising:
  normalizing the input rhythm pattern; and
  comparing the normalized input pattern to the plurality of registered rhythm patterns stored in the storage means in association with the content data.

35. The communication method according to claim 34, wherein comparing the normalized input rhythm pattern further comprises:
  comparing the normalized input rhythm pattern to the plurality of registered rhythm patterns using a dynamic programming matching method.

36. The communication method according to claim 33, wherein retrieving the content data further comprises:
  detecting the plurality of registered rhythm patterns which are stored in the storage means and which are similar to the input rhythm pattern; and
  retrieving plural content data corresponding to the plurality of registered rhythm patterns.

37. The communication method according to claim 33, wherein the content data is music number data.

38. The communication method according to claim 37, further comprising:
  extracting at least a fraction of the music number data stored in the storage means; and
  registering the extracted fraction in the storage means.

39. A communication apparatus comprising:
  receiving means for receiving an input rhythm pattern of a retrieval keyword for content data, the input rhythm pattern comprising changes between only a first state and a second state along a time axis;
  storage means for storing a plurality of content data, each content data having a plurality of retrieval keywords, and each retrieval keyword having a registered rhythm pattern;
  comparing means for comparing the input rhythm pattern to a registered rhythm pattern of a retrieval keyword;
  retrieving means for retrieving the content data stored in the storage means based on an input rhythm pattern received by the receiving means; and
  transmission means for transmitting the content data corresponding to the retrieved results of the retrieval means to another apparatus.

40. The communication apparatus according to claim 39, wherein the retrieving means retrieves the content data stored in the storage means based on the results of the comparison by the comparing means.

41. The communication apparatus according to claim 40, further comprising:
  normalizing means for normalizing the input rhythm pattern received by the receiving means, and
  wherein the comparing means compares a normalized input rhythm pattern to the plurality of registered rhythm patterns stored in the storage means in association with the content data.

42. The communication apparatus according to claim 41, wherein the comparing means compares, using a dynamic programming matching method, the normalized input rhythm pattern to a plurality of normalized registered rhythm patterns stored in the storage means.

43. The communication apparatus according to claim 40, wherein the retrieving means detects the plurality of registered rhythm patterns which are stored in the storage means and which are similar to the input rhythm pattern and retrieves plural content data corresponding to the plurality of registered rhythm patterns.

44. The communication apparatus according to claim 39, wherein the content data is music number data.

45. The communication apparatus according to claim 44, further comprising:
  extraction means for extracting at least a fraction of the music number data stored in the storage means; and
  registration means for registering an extracted fraction.

46. A communication method comprising:
  storing a plurality of content data, in a storage means of a first apparatus, each content data having a plurality of retrieval keywords, and each retrieval keyword having a registered rhythm pattern;
  receiving, at the first apparatus, an input rhythm pattern of a retrieval keyword, the input rhythm pattern comprising changes between only a first state and a second state along a time axis;
  comparing the input rhythm pattern to a registered rhythm pattern of a retrieval keyword;
  retrieving the content data stored in the storage means based on the received input rhythm pattern; and
  transmitting the content data complying with the retrieved result to a second apparatus.

47. The communication method according to claim 46, wherein the content data is retrieved based on the results of the comparison.

48. The communication method according to claim 47, further comprising:
normalizing the input rhythm pattern; and
comparing the normalized input pattern to the plurality of registered rhythm patterns stored in the storage means in association with the content data.

49. The communication method according to claim 48, wherein comparing the normalized input rhythm pattern further comprises:
comparing the normalized input rhythm pattern to the plurality of registered rhythm patterns using a dynamic programming matching method.

50. The communication method according to claim 47, wherein retrieving the content data further comprises:
detecting the plurality of registered rhythm patterns which are stored in the storage means and which are similar to the input rhythm pattern; and
retrieving plural content data corresponding to the plurality of registered rhythm patterns.

51. The communication method according to claim 46, wherein the content data is music number data.

52. The communication method according to claim 51, further comprising:
extracting at least a fraction of music number data stored in the storage means; and
registering the extracted fraction in the storage means.

53. A communication apparatus comprising:
a single inputting means for inputting, by switching between only a first state and a second state, a rhythm pattern of a retrieval keyword;
transmission means for transmitting the input rhythm pattern to another apparatus where a plurality of content data are stored, each content data having a plurality of retrieval keywords, and each retrieval keyword having a registered rhythm pattern;
comparing means for comparing the input rhythm pattern to a registered rhythm pattern of a retrieval keyword;
receiving means for receiving retrieved results complying with the input rhythm pattern and for receiving the content data complying with a request for transmission; and
recording and/or reproducing means for recording and/or reproducing the content data received by the receiving means.

54. The communication apparatus according to claim 53, further comprising:
normalization means for normalizing the input rhythm pattern transmitted to the other apparatus.

55. The communication apparatus according to claim 53, wherein the content data is music number data.

56. A communication method comprising:
inputting a rhythm pattern, by switching between only a first state and a second state of a single inputting device, of a retrieval keyword at a first apparatus;
transmitting the input rhythm pattern to a second apparatus, the second apparatus storing content data, each content data having a plurality of retrieval keywords, and each retrieval keyword having a registered rhythm pattern;
comparing, at the second apparatus, the input rhythm pattern to a registered rhythm pattern of a retrieval keyword;
receiving, at the first apparatus, retrieved results complying with the input rhythm pattern;
selecting, at the first apparatus, at least one content data from the received result of retrieval and transmitting a request to the second apparatus for transmission of selected content data;
receiving, at the first apparatus, the content data complying with the transmission request; and
recording and/or reproducing, at the first apparatus, the received content data.

57. The communication method according to claim 56, further comprising:
normalizing the input rhythm pattern transmitted to the second apparatus.

58. The communication method according to claim 56, wherein the content data is music number data.

59. A content retrieval apparatus comprising:
a storage unit configured for storing a plurality of content data, each content data having a plurality of retrieval keywords and each retrieval keyword having a registered rhythm pattern;
a single inputting unit configured for inputting, by switching between only a first state and a second state, an input rhythm pattern of a retrieval keyword;
a retrieval unit configured for retrieving content data stored in the storage unit by comparing the input rhythm pattern to a registered rhythm pattern of a retrieval keyword; and
a display unit configured for providing information relevant to the content data retrieved by the retrieval unit.

60. The content retrieval apparatus according to claim 59, wherein the retrieval unit normalizes the input rhythm pattern and compares a normalized input rhythm pattern to a plurality of normalized registered rhythm patterns stored in the storage unit.

61. The content retrieval apparatus according to claim 60, wherein the retrieval unit compares, using a dynamic programming matching method, the normalized input rhythm pattern to the normalized registered rhythm patterns stored in the storage unit.

62. The content retrieval apparatus according to claim 59, wherein the retrieval unit detects the plurality of registered rhythm patterns which are stored in the storage unit and which are similar to the input rhythm pattern and retrieves plural content data corresponding to the plurality of registered rhythm patterns.

63. The content retrieval apparatus according to claim 59, wherein the content data is the music number data.

64. The content retrieval apparatus according to claim 63, wherein the retrieval unit configured to extract at least a fraction of the music number data, the fraction of the music number data extracted being registered in the storage unit.

65. The content retrieval apparatus according to claim 59, wherein the input rhythm pattern is a title rhythm pattern of the content data.

66. A communication apparatus comprising:
a receiving unit configured for receiving an input rhythm pattern, the input rhythm pattern comprising changes between only a first state and a second state along a time axis;
a storage unit configured for storing a plurality of content data, each content data having a plurality of retrieval keywords and each retrieval keyword having a registered rhythm pattern;
a comparing unit configured for comparing the input rhythm pattern, corresponding to a retrieval keyword, to a registered rhythm pattern of a retrieval keyword;

a retrieval unit configured for retrieving the content data stored in the storage unit based on the input rhythm pattern received by the receiving unit; and a transmitting unit configured for transmitting the content data corresponding to the retrieved results of the retrieval unit to another apparatus.

67. The communication apparatus according to claim 66, wherein the retrieval unit retrieves the content data stored in the storage unit based on the results of the comparison by the comparing unit.

68. The communication apparatus according to claim 67, further comprising:

a normalizing unit configured for normalizing the input rhythm pattern received by the receiving unit, and wherein the comparing unit compares normalized input rhythm patterns to the plurality of registered rhythm patterns stored in the storage unit in association with the content data.

69. The communication apparatus according to claim 68, wherein the comparing unit compares, using a dynamic programming matching method, the normalized input rhythm pattern to a plurality of normalized registered rhythm patterns stored in the storage unit.

70. The communication apparatus according to claim 67, wherein the retrieval unit detects the plurality of registered rhythm patterns which are stored in the storage unit and which are similar to the input rhythm pattern and retrieves plural content data corresponding to the plurality of registered rhythm patterns.

71. The communication apparatus according to claim 66, wherein the content data is music number data.

72. The communication apparatus according to claim 71, further comprising:

an extraction unit configured to extract at least a fraction of the music number data stored in the storage unit; and a registration unit for registering an extracted fraction.

73. A communication apparatus comprising:

single inputting unit for inputting a rhythm pattern of a retrieval keyword entered as a series of digital highs and lows by switching between only a first state and second state;

a transmitting unit for transmitting the input rhythm pattern to another apparatus where a plurality of content data are stored, each content data having a plurality of retrieval keywords and each retrieval keyword having a registered rhythm pattern;

a comparing unit for comparing the input rhythm pattern to a registered rhythm pattern of a retrieval keyword;

a receiving unit for receiving retrieved results complying with the input rhythm pattern transmitted from the other apparatus and for receiving the content data complying with a request for transmission; and a recording and/or reproducing unit for recording and/or reproducing the content data received by the receiving unit.

74. The communication apparatus according to claim 73, further comprising:

a normalization unit for normalizing the input rhythm pattern transmitted to the other apparatus.

75. The communication apparatus according to claim 73, wherein the content data is music number data.

* * * * *